Figure 63:
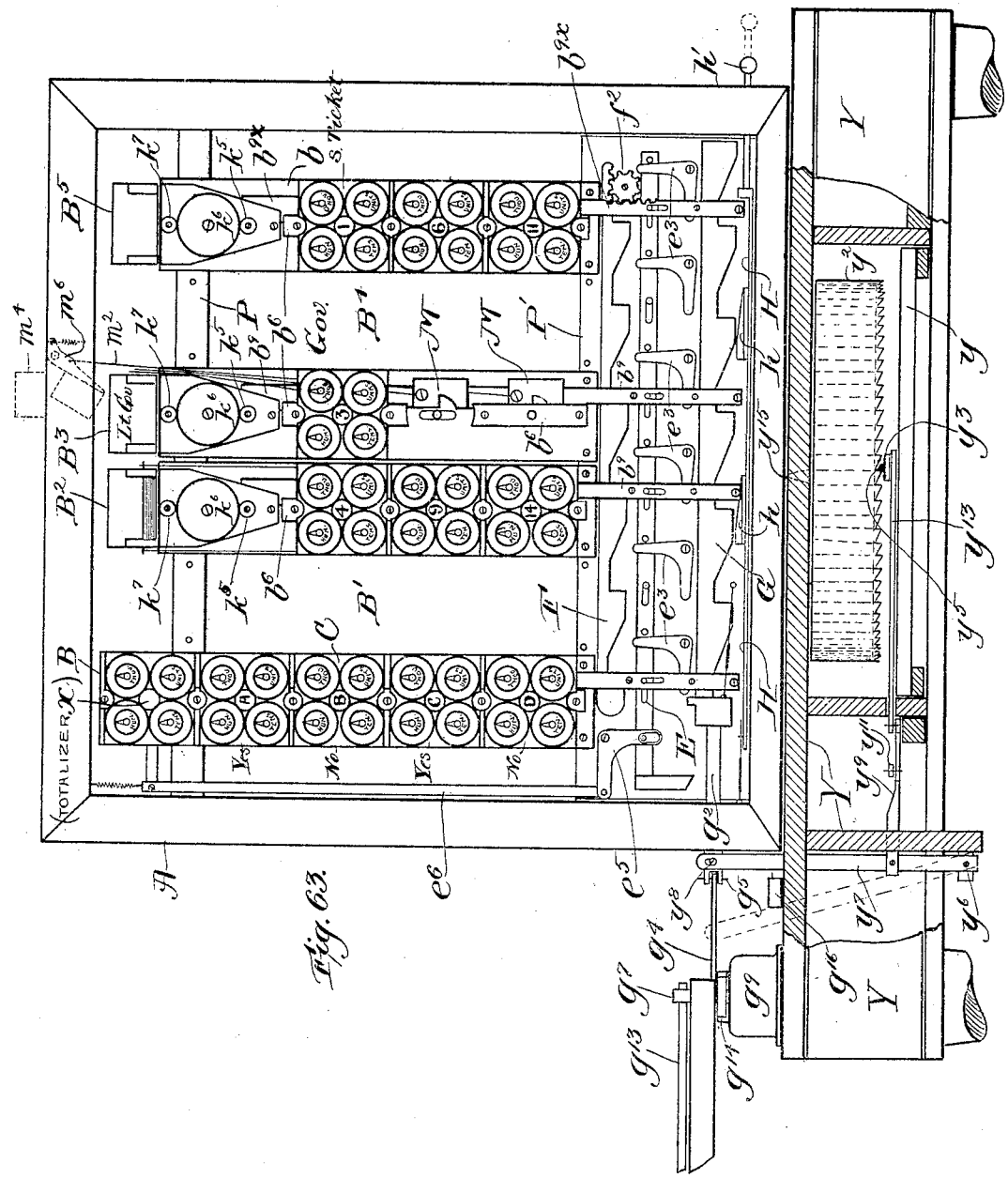

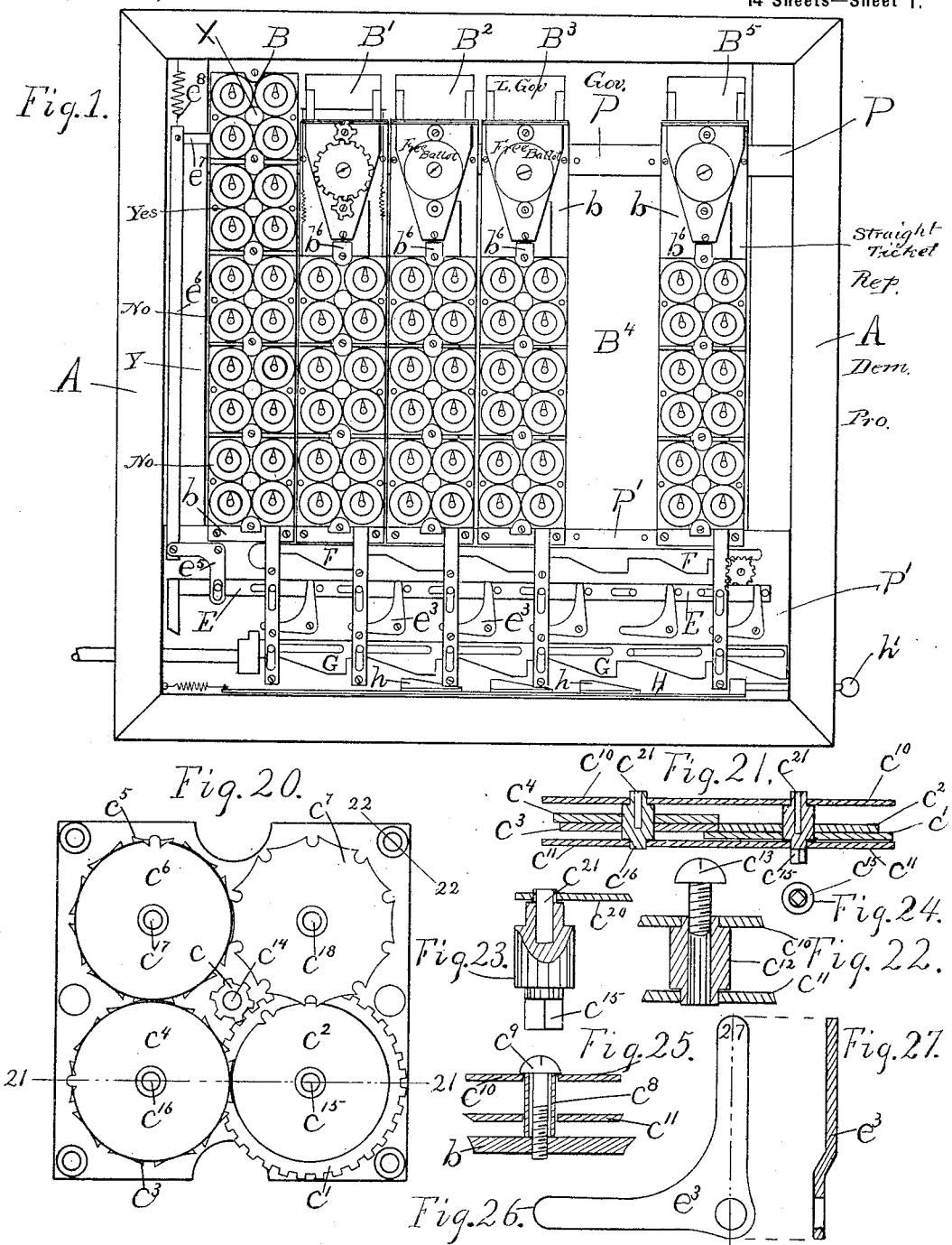

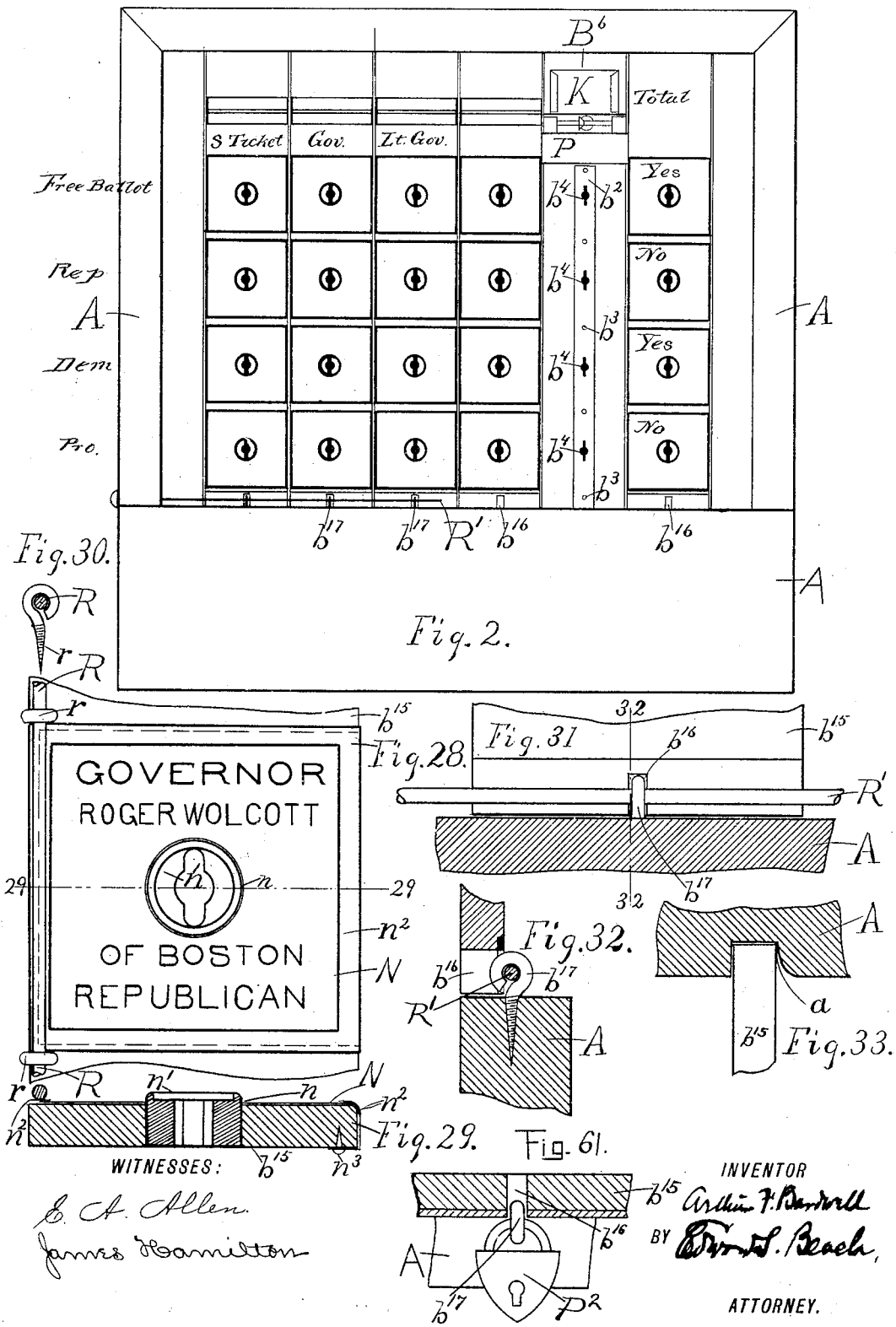

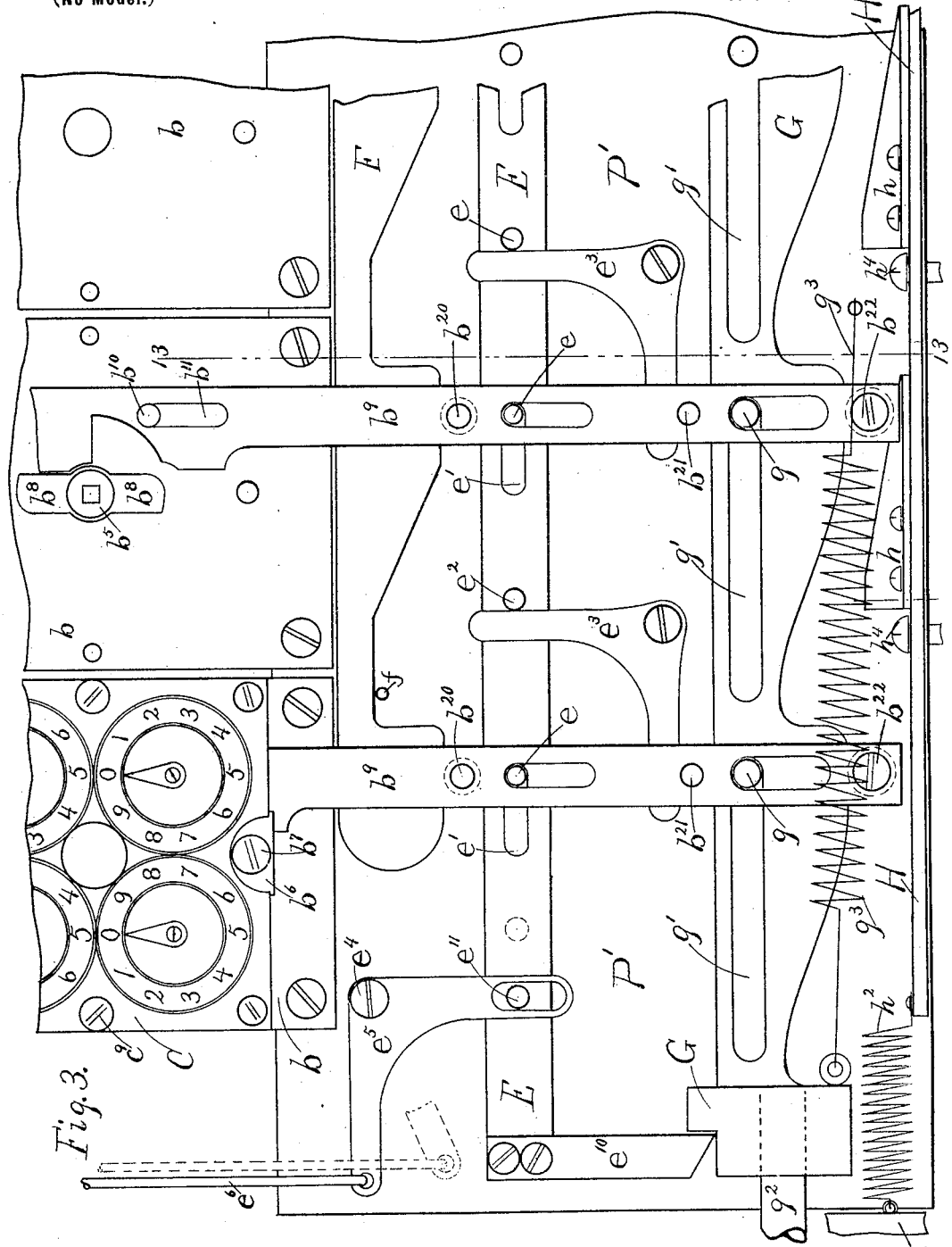

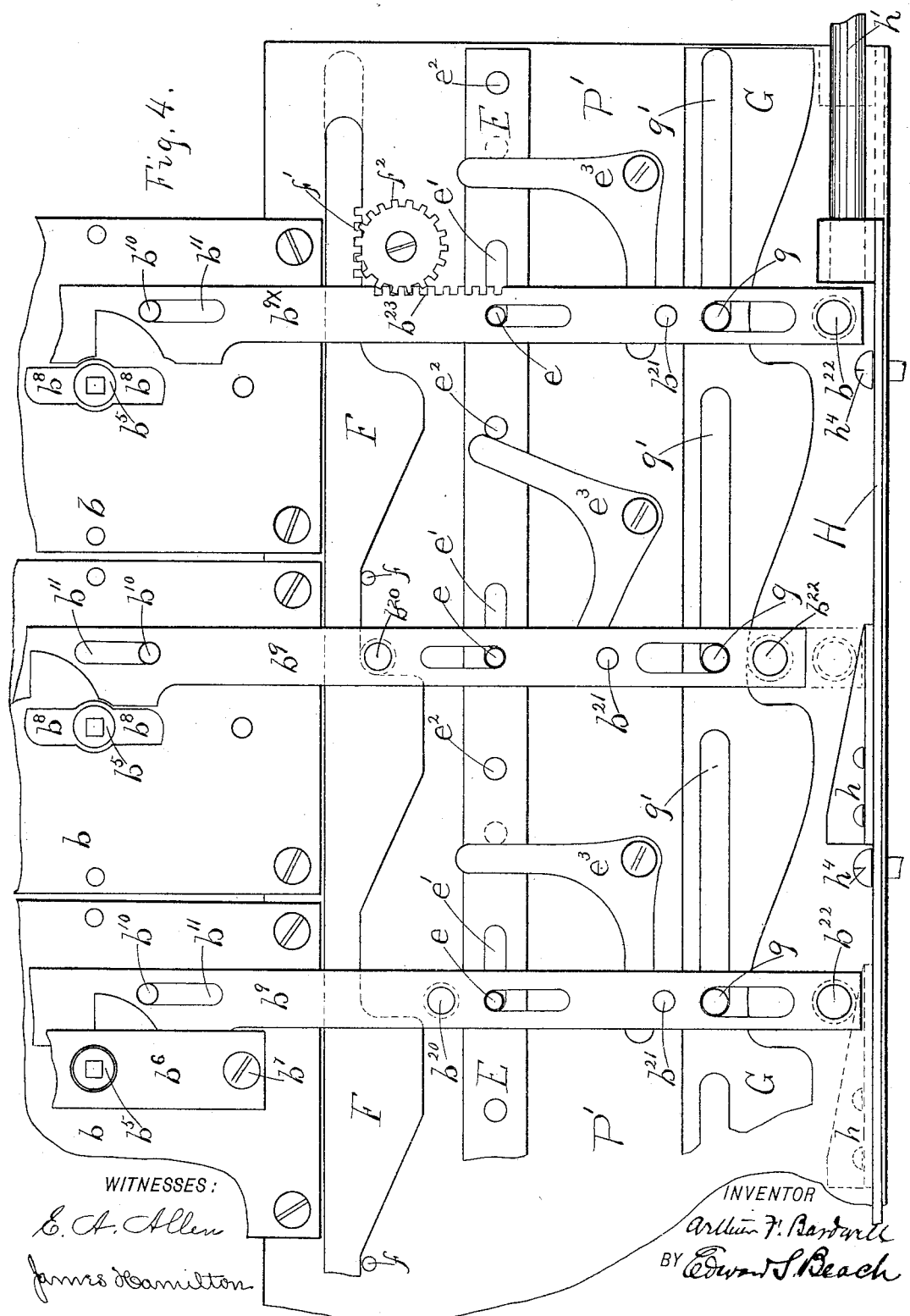

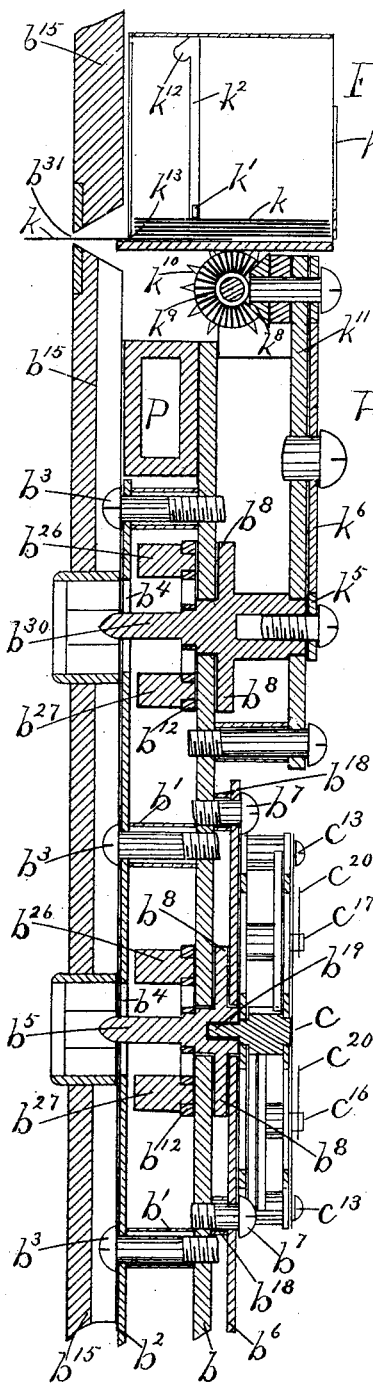

No. 640,355. Patented Jan. 2, 1900.
A. F. BARDWELL.
AUTOMATIC REGISTERING MACHINE.
(Application filed Nov. 16, 1898.)
(No Model.) 14 Sheets—Sheet 6.
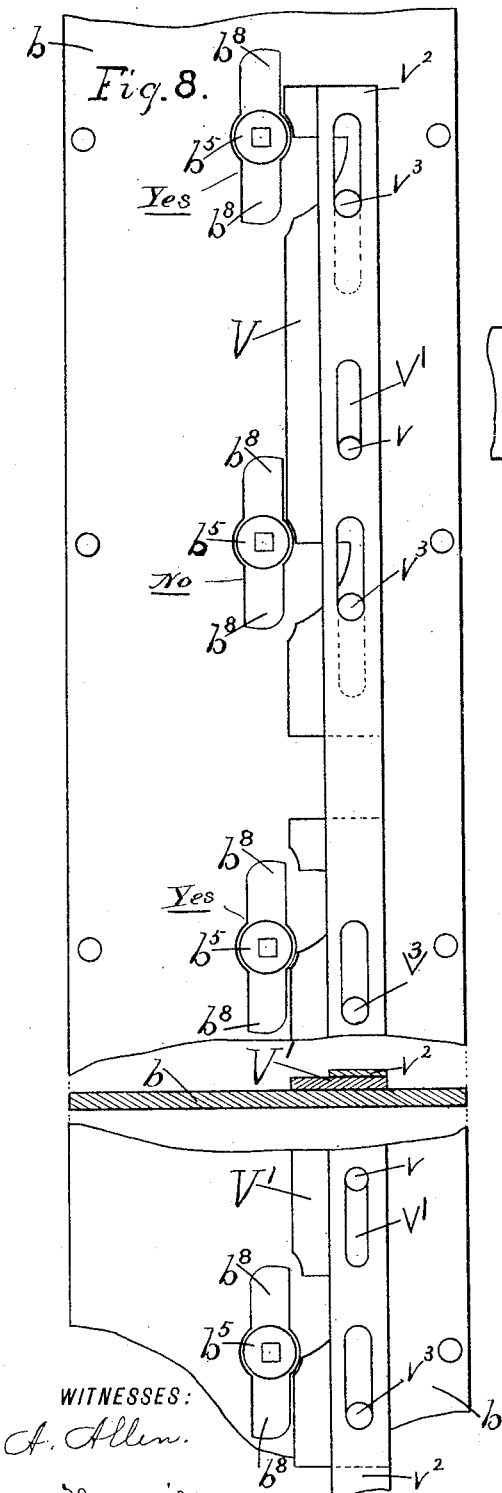
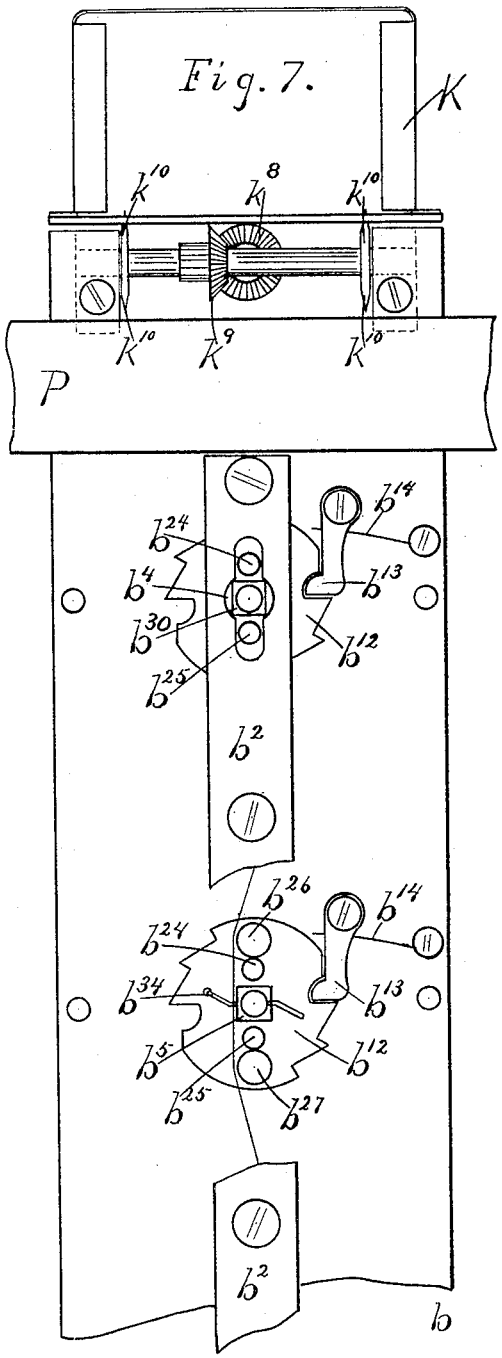

No. 640,355. Patented Jan. 2, 1900.
A. F. BARDWELL.
AUTOMATIC REGISTERING MACHINE.
(Application filed Nov. 16, 1898.)
(No Model.) 14 Sheets—Sheet 7.
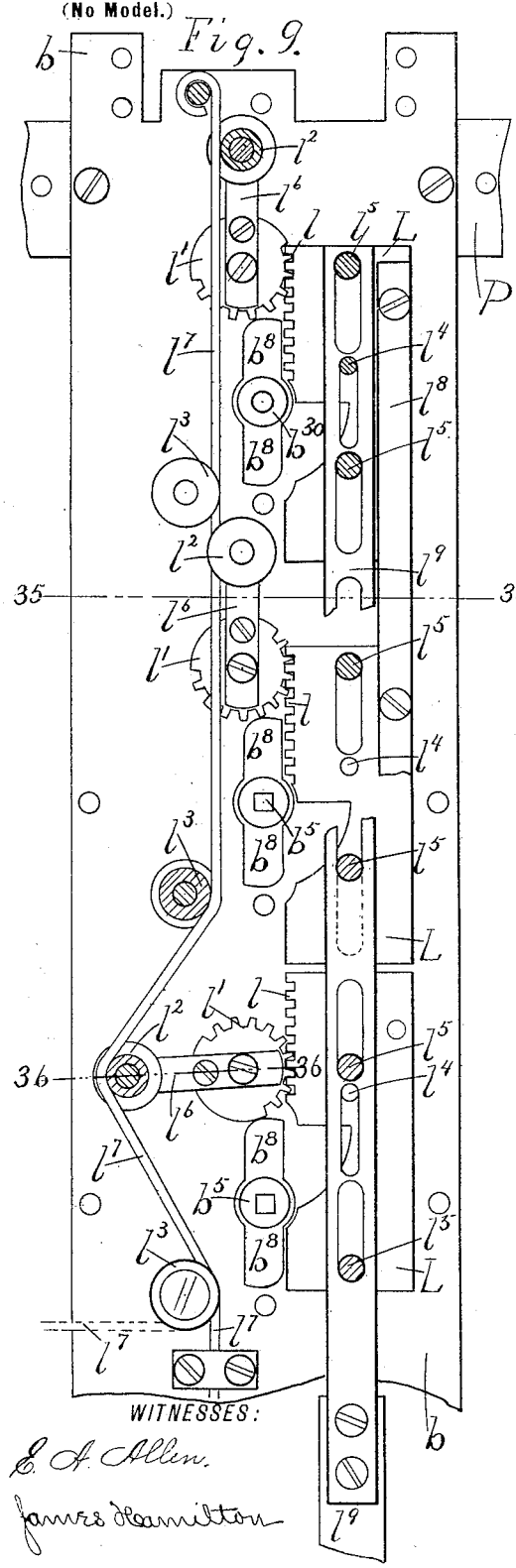
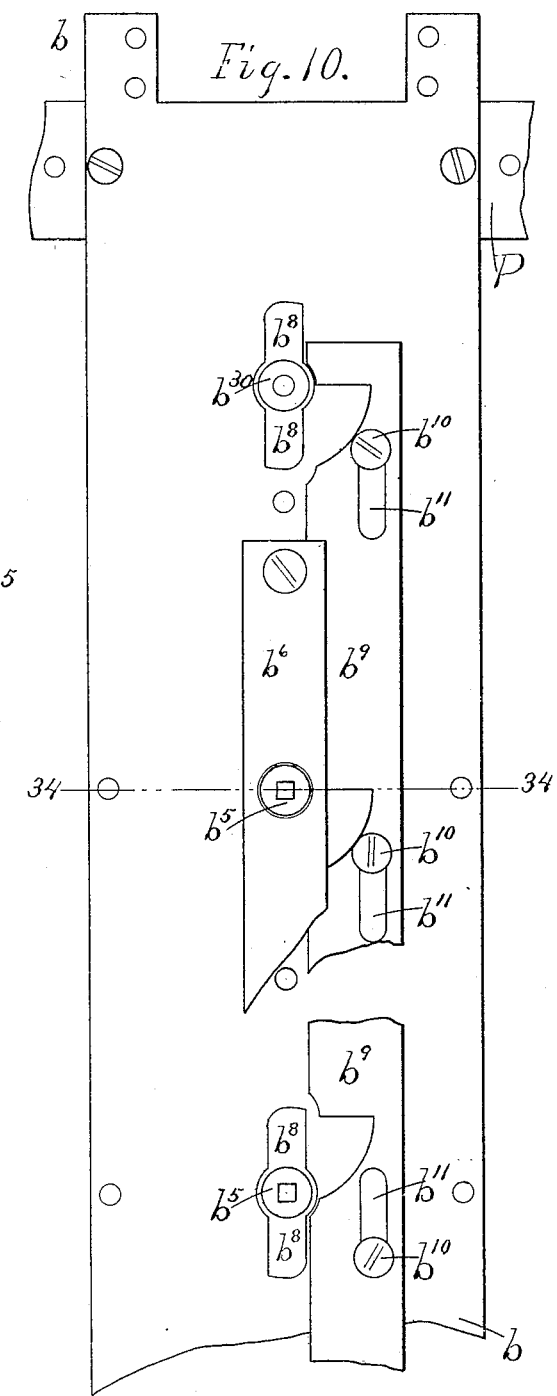
WITNESSES:
E. A. Allen.
James Hamilton
INVENTOR
Arthur F. Bardwell
BY Edmond S. Beach
ATTORNEY.

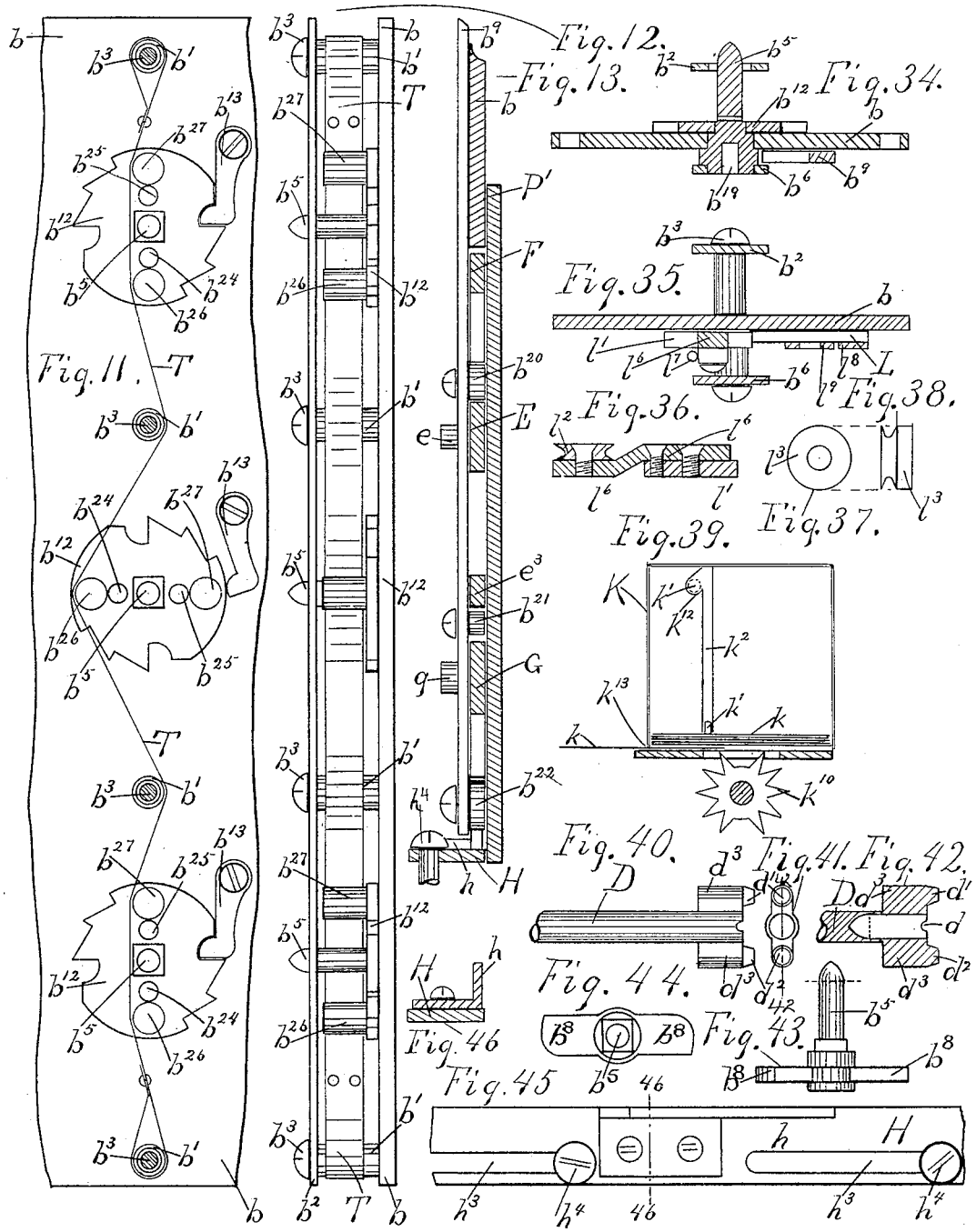

No. 640,355. Patented Jan. 2, 1900.
A. F. BARDWELL.
AUTOMATIC REGISTERING MACHINE.
(Application filed Nov. 16, 1898.)
(No Model.) 14 Sheets—Sheet 9.
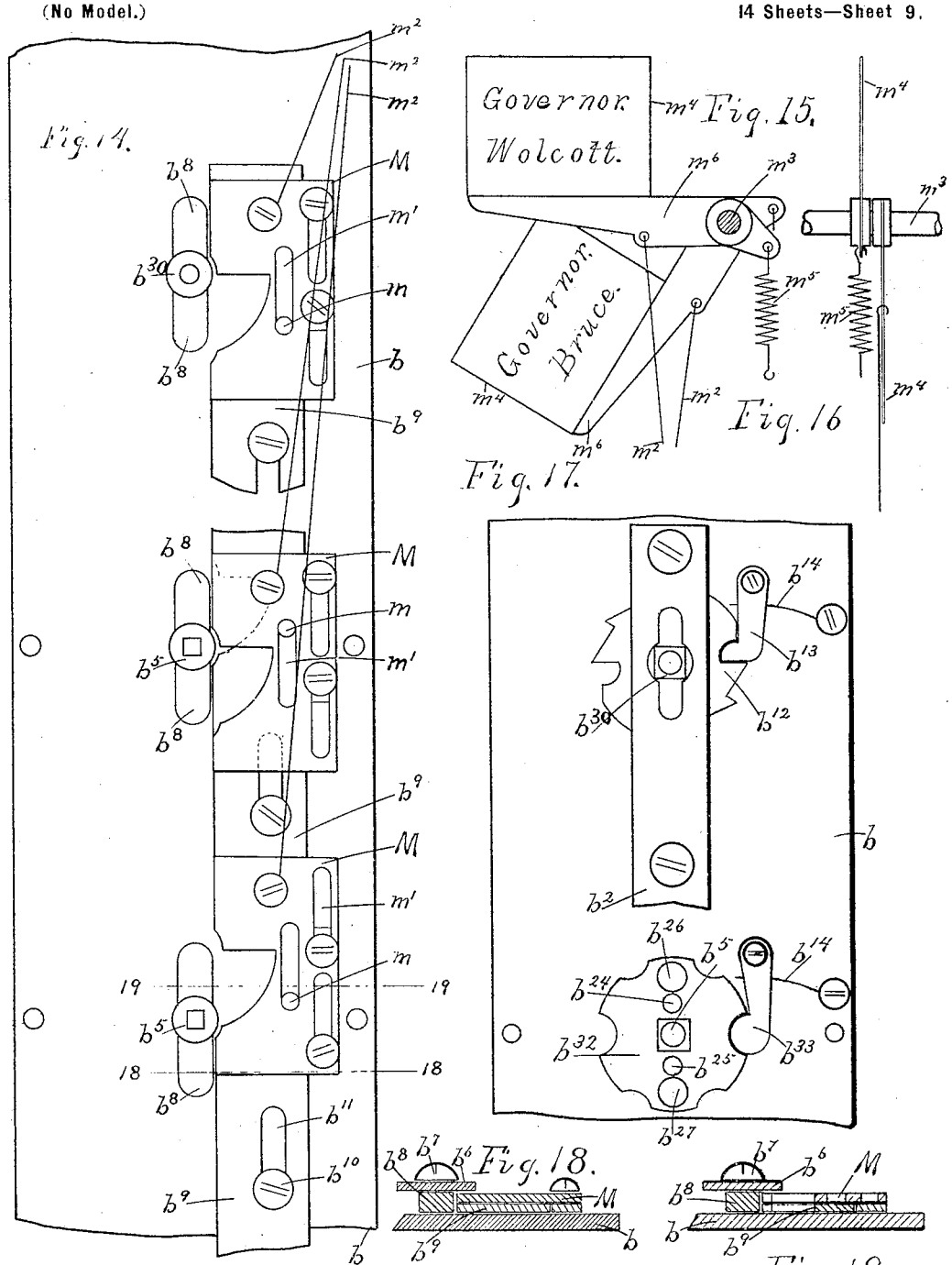
WITNESSES:
E. A. Allen.
James Hamilton
INVENTOR
Arthur F. Bardwell
BY Edward S. Beach,
ATTORNEY.

No. 640,355. Patented Jan. 2, 1900.
A. F. BARDWELL.
AUTOMATIC REGISTERING MACHINE.
(Application filed Nov. 16, 1898.)
(No Model.) 14 Sheets—Sheet 10.
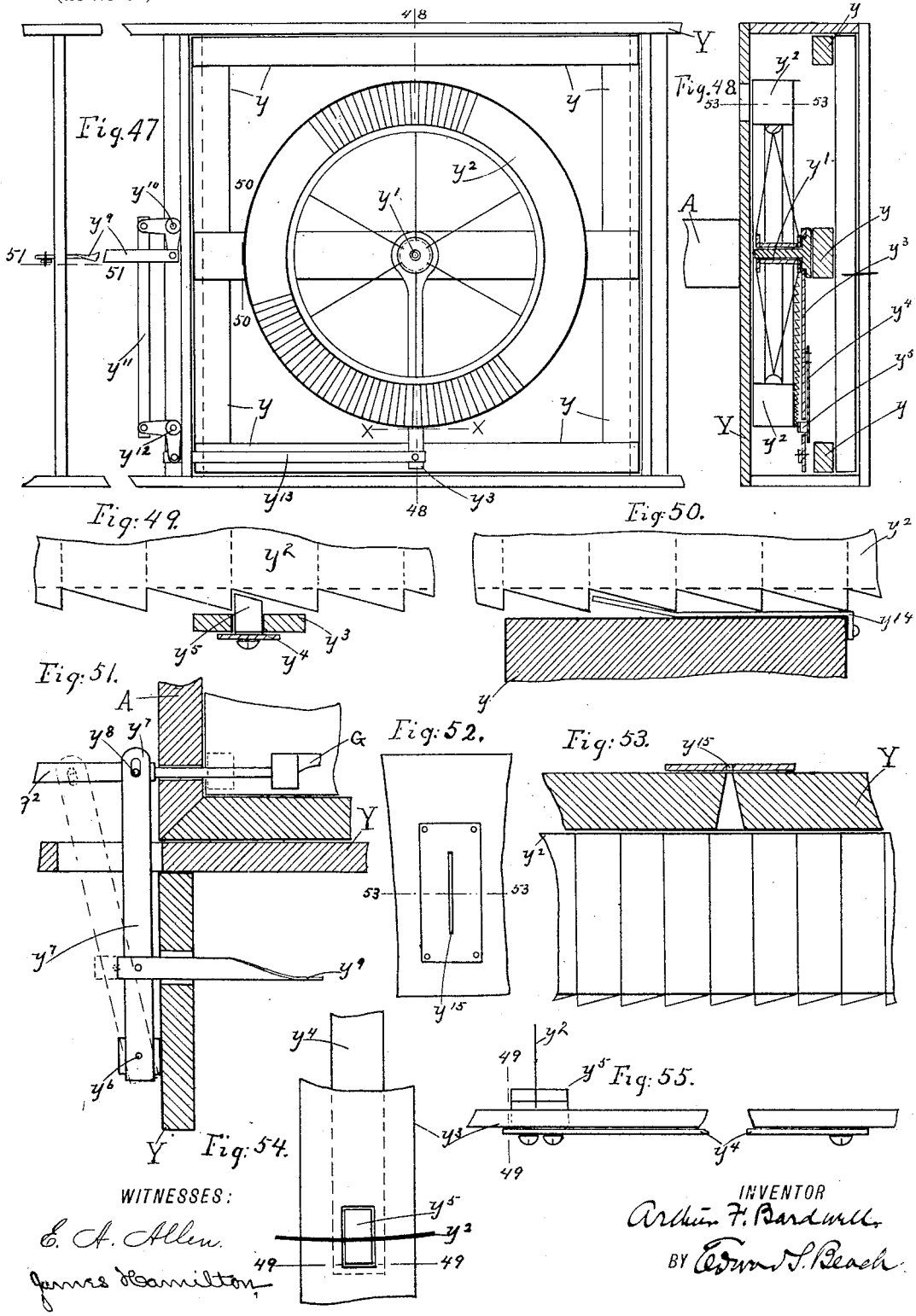

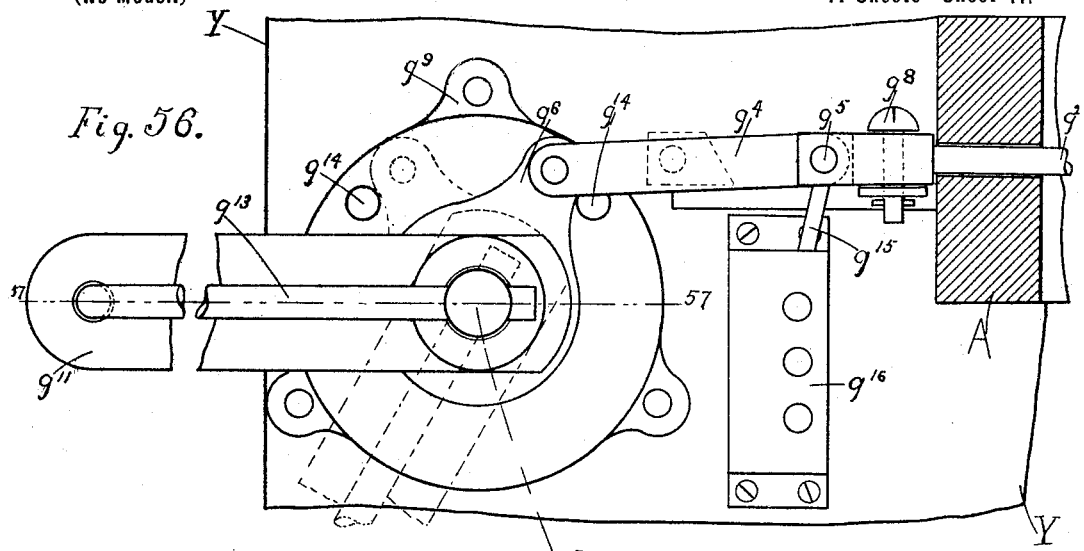
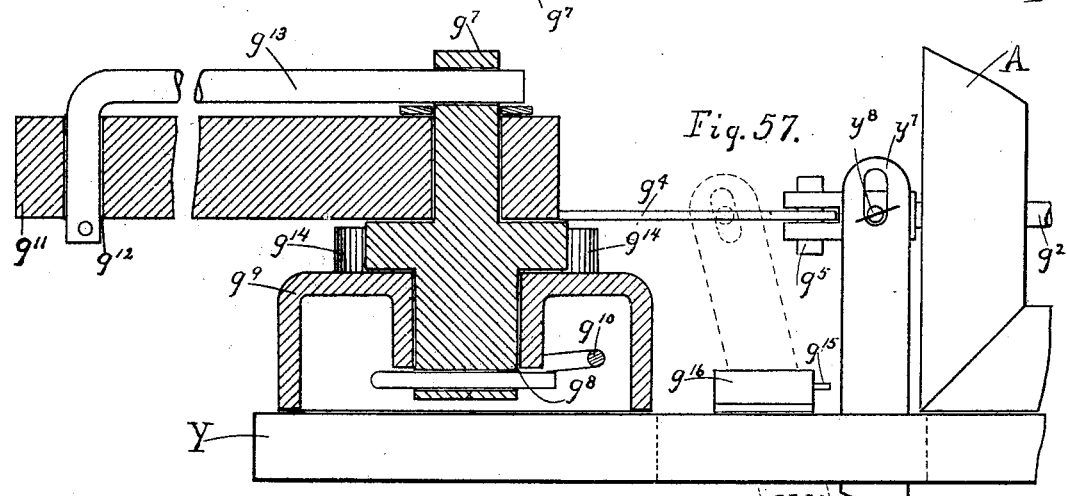
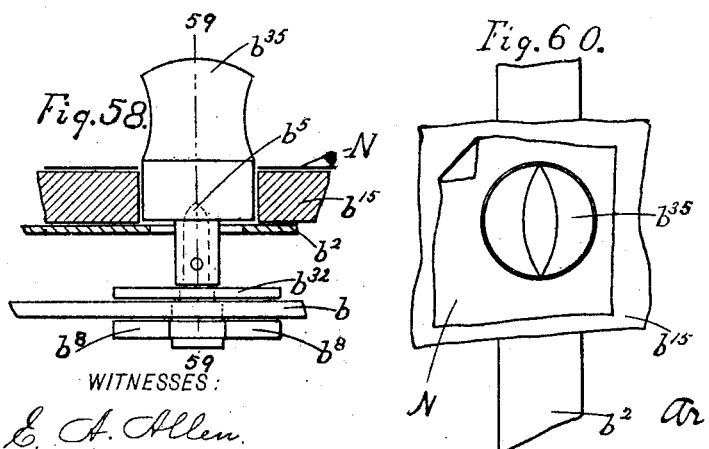

No. 640,355. Patented Jan. 2, 1900.
A. F. BARDWELL.
AUTOMATIC REGISTERING MACHINE.
(Application filed Nov. 16, 1898.)
(No Model.) 14 Sheets—Sheet 12.
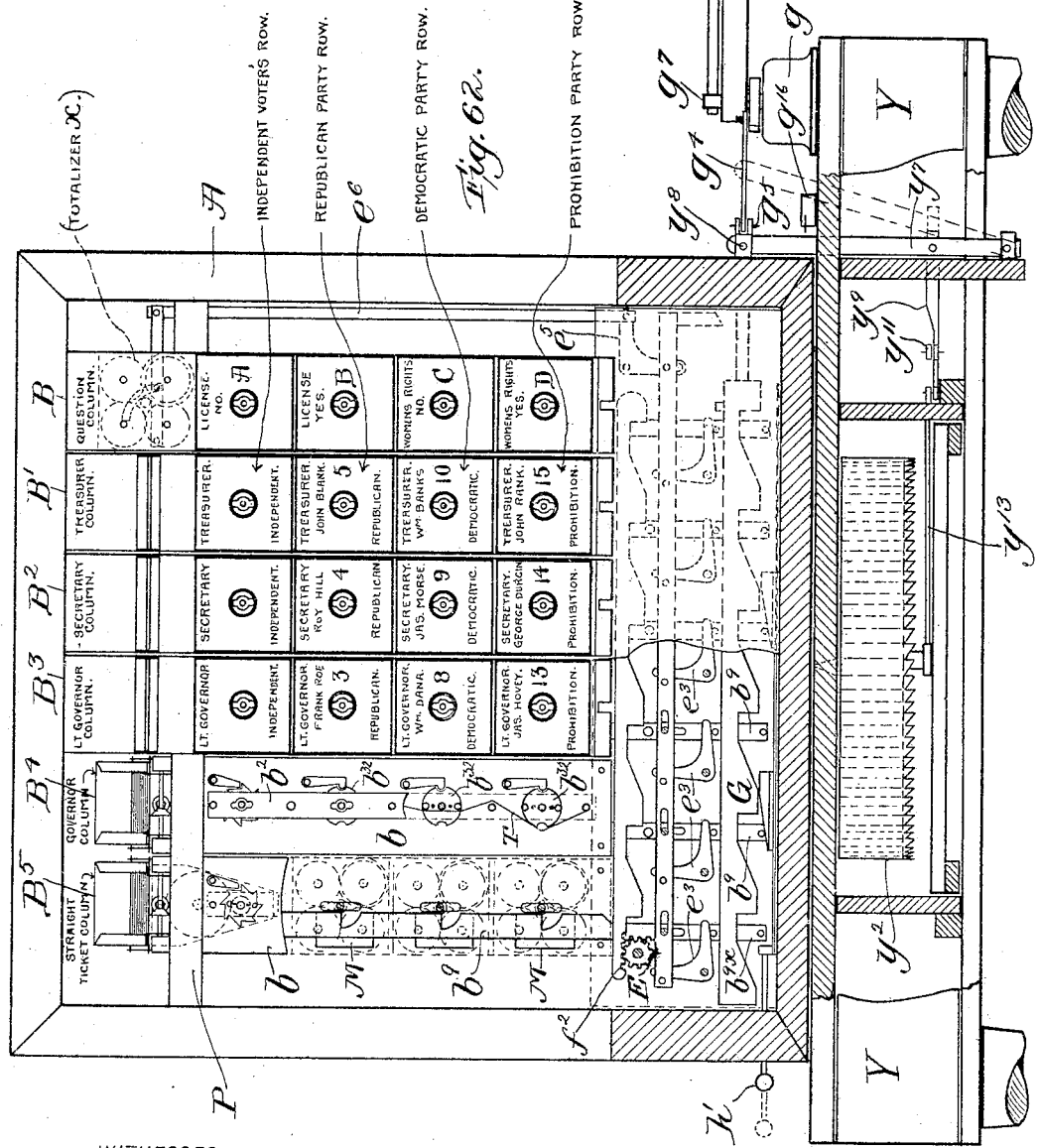
WITNESSES:
E. A. Allen.
J. A. Deichert
INVENTOR
Arthur F. Bardwell
BY
Edward S. Beach
ATTORNEY.

No. 640,355. Patented Jan. 2, 1900.
A. F. BARDWELL.
AUTOMATIC REGISTERING MACHINE.
(Application filed Nov. 16, 1898.)
(No Model.) 14 Sheets—Sheet 13.

WITNESSES:
E. A. Allen.
J. A. Deichert

INVENTOR
Arthur F. Bardwell
BY Edward S. Beach
ATTORNEY.

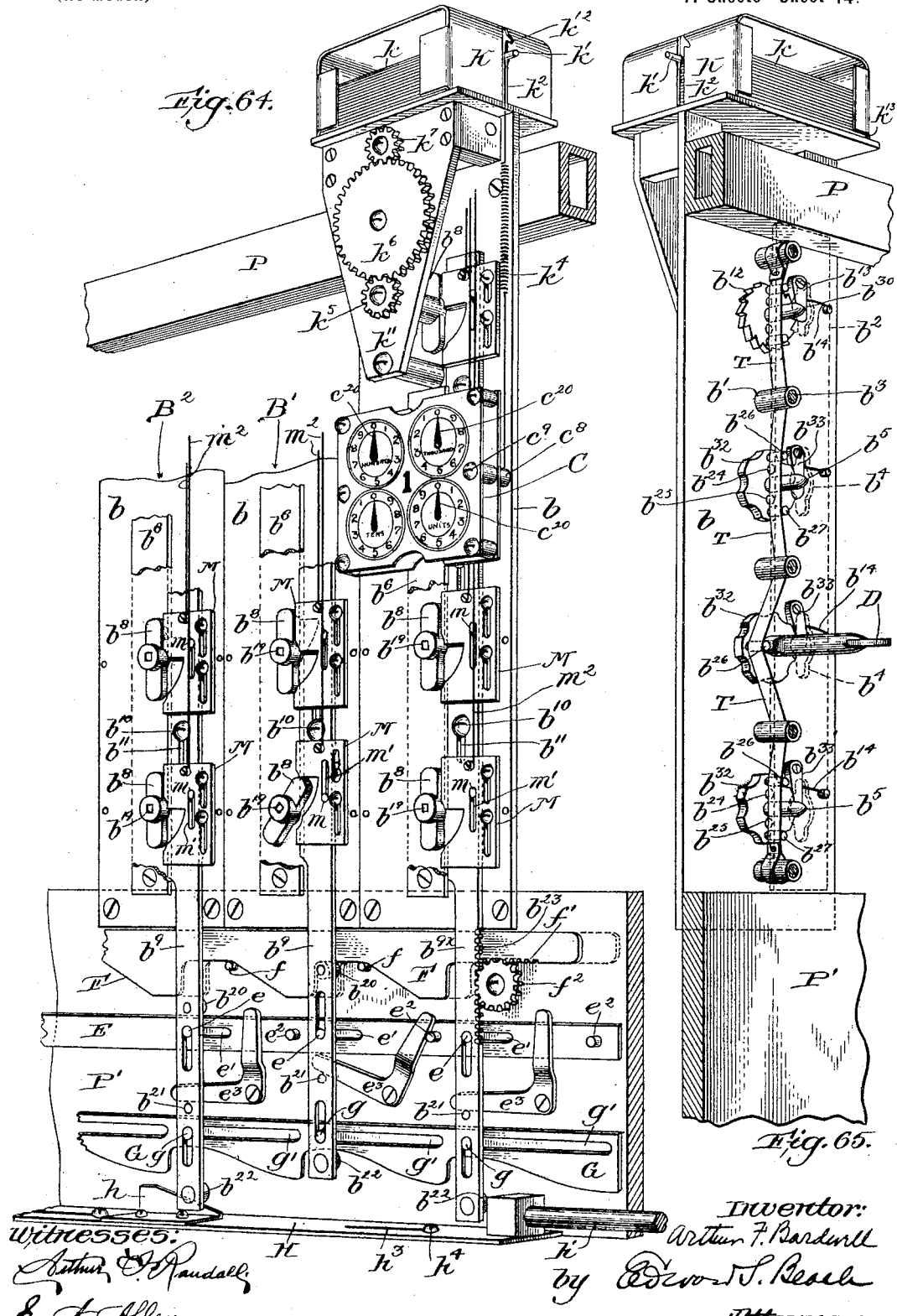

UNITED STATES PATENT OFFICE.

ARTHUR FRANCIS BARDWELL, OF SPRINGFIELD, MASSACHUSETTS, ASSIGNOR TO THE BARDWELL VOTOMETER COMPANY, OF BOSTON, MASSACHUSETTS.

AUTOMATIC REGISTERING-MACHINE.

SPECIFICATION forming part of Letters Patent No. 640,355, dated January 2, 1900.

Application filed November 16, 1898. Serial No. 696,573. (No model.)

*To all whom it may concern:*

Be it known that I, ARTHUR FRANCIS BARDWELL, a citizen of the United States, and a resident of Springfield, in the county of Hampden and State of Massachusetts, have invented a new and Improved Automatic Registering-Machine, of which the following is a specification.

Reference being had to the accompanying drawings, Figure 1 is a rear elevation of my registering-machine, showing one of the sections removed, but not showing the table-support and its inclosed and connected mechanism. Fig. 2 is a front elevation of my registering-machine, showing the front casing removed from one of the sections, but not showing the table-support and its inclosed and connected mechanism. Fig. 3 shows in detail one end of the interlocking slide, of the recording-slide, of the resetting-slide, and of the elevating-slide. Fig. 4 shows in detail the other end of the same parts as are shown in Fig. 3, but in a different position, and also the arrangement of a section for "straight" ticket" voting. Fig. 5 shows in detail a rear elevation of the upper portion of a section of my registering-machine. Fig. 6 is a section on line 6 6 of Fig. 5. Fig. 7 shows in detail the ratchet-wheel mechanism to prevent the register's being turned backward. Fig. 8 shows in rear elevation the arrangement of the locking-slide in the section which registers the vote upon questions of the "yes" and "no" vote. Fig. 9 shows in rear elevation the arrangement of the section which registers the vote in the case where several candidates are to be elected to the same office. Fig. 10 is a rear elevation of a section with the card-delivering mechanism and the register removed. Fig. 11 is a detail view showing in front elevation the arrangement of the tape which prevents more than one register's being operated at the same time in the same section. Fig. 12 is a side elevation of the parts shown in Fig. 11. Fig. 13 is a section on line 13 13 of Fig. 3. Fig. 14 is a detail view showing in rear elevation the arrangement of the parts which permit a voter to change his vote. Fig. 15 is a detail of the mechanism which indicates the particular register which has been actuated. Fig. 16 is a side elevation of the parts shown in Fig. 15. Fig. 17 shows in detail the form of ratchet-wheel which permits a key-piece to be turned backward and also in part view the other form of ratchet-wheel. Fig. 18 is a section on line 18 18 of Fig. 14. Fig. 19 is a section on line 19 19 of Fig. 14. Fig. 20 is a rear elevation of the register with its face-plate removed. Fig. 21 is a section on line 21 21 of Fig. 20. Fig. 22 is an enlarged section on line 22 22 of Fig. 20, showing the manner of fastening together the plates of the register. Fig. 23 is a detail showing the manner of fixing the index-finger to the arbor of the wheels of the register. Fig. 24 shows the end of the arbor $c^{15}$ in Fig. 21. Fig. 25 shows the manner in which the register is secured to the back plate, being a section on line 25 25 of Fig. 5. Fig. 26 is a front elevation of the bell-crank lever which operates the recording-slide. Fig. 27 is a section on line 27 27 of Fig. 26. Fig. 28 shows the manner in which the name-cards are secured to the front casing. Fig. 29 is a section on line 29 29 of Fig. 28. Fig. 30 is a detail showing screw-eye. Fig. 31 shows mode in which the bottom of the front casing of a section is secured in the frame. Fig. 32 is a section on line 32 32 of Fig. 31. Fig. 33 is a sectional view showing the manner in which the top of a section of the front casing is secured in the frame. Fig. 34 is a section on line 34 34 of Fig. 10. Fig. 35 is a section on line 35 35 of Fig. 9. Fig. 36 is a section on line 36 36 of Fig. 9. Fig. 37 is a front view of the grooved wheel shown at $l^3$ in Fig. 9. Fig. 38 is a side elevation of the grooved wheel. Fig. 39 is a section on line 39 39 of Fig. 5, showing a detail of the star-wheel and card-box. Fig. 40 is a side elevation of a portion of the key. Fig. 41 is an end elevation of Fig. 40. Fig. 42 is a section on line 42 42 of Fig. 41 and shows in dotted lines a special form of key. Fig. 43 is the key-piece which forms one portion of the main shaft of the register. Fig. 44 is a plan view of Fig. 43 from above. Fig. 45 is a plan view of a portion of the elevating-slide. Fig. 46 is a section on line 46 46 of Fig. 45. Fig. 47 is a plan view of the table-support with the top of the table removed to show the receptacle for independent votes. Fig. 48 is a section on line 48 48 of Fig. 47. Fig. 49 is a section on line 49 49 of Figs. 54 and 55. Fig. 50 is a section on line 50 50 of Fig. 47. Fig. 51 is a section on line 51 51 of Fig. 47, but showing the top of the table and the frame A in place. Fig. 52 is a plan view of the slit looking down upon the top of the table. Fig. 53 is a section on line 53 53 of Figs. 48 and 52. Fig. 54 is a detail showing a portion of the arm $y^3$ in plan near $x\ x$ of Fig. 47. Fig. 55 is a side view of same parts as are shown in Fig. 54. Fig. 56 is a plan view of the resetting mechanism actuated by a voter's passing out. Fig. 57 is a section on line 57 57 of Fig. 56. The following Figs. 58 to 60 show modifications of the actuating mechanism. Fig. 58 shows a turning-knob secured to the main shaft as a substitute for the key D in Fig. 40. Fig. 59 is a central vertical section of Fig. 58 on line 59 59, the knob being turned through ninety degrees. Fig. 60 is a plan view of Fig. 58. Fig. 61 shows a padlock as a means of securing an individual section of the front casing in place. Fig. 62 is a front elevation of my machine, some of the parts being broken away in order to show the mechanism. Fig. 63 is a rear elevation of my machine, some of the parts being broken away in order to show the mechanism. Fig. 64 is a rear perspective view of the interlocking mechanism, the locking-slide of the middle group being shown raised to its locking position. Fig. 65 is a front perspective view of a group, showing the key in place and partly turned.

My invention relates to registering-machines, and has for an object to provide a registering-machine which for voting purposes possesses the elasticity of the Australian-ballot system and the secrecy of that system, yet free from its defects, particularly in that a defective ballot or an illegal ballot cannot be cast by my registering-machine.

A second object is to provide a registering-machine in which all the parts are in operative connection with one another, and thus render the operation of the machine absolutely positive.

The main features of my invention are the rotary registers which are themselves directly actuated by the operator. With my machine the operator cannot be deceived into believing that he has registered when, in fact, he has not. If the operator turns the register-shaft which he makes fast to, he must turn the register and so make a record upon it.

Another feature is the locking-slide, which is raised by the turning of the register-shaft into a position in which it locks all the registers in that section against forward movement.

My invention also comprehends means which prevent the reverse movement of any register which has not been actuated and yet which permit the reversal of the register just actuated, but only so far as to cancel the record made by the operator himself. A system of visual indicators informs the operator which register he has actuated, and thereby aids in the detection and rectification of errors.

In my invention great flexibility of arrangement is permissible. The registers are arranged in sections, and the sections are removable, so that they may be repaired or replaced by others adapted to some different form of voting, and the names of the candidates may be arranged according to party candidacy or in the alphabetical order.

Another feature of my invention is the means provided for the prevention of double voting and repeating. Only one register in any one section can be operated at the same time, and provision is made whereby the operator is prevented from operating more than the allowed number of registers in any one section. Provision is made in my registering-machines for "straight-ticket," "selective," "split-ticket," and "independent" voting and for voting upon constitutional amendments and other questions.

Another feature is the provision made for special voters, as female voters and poll-tax payers, allowing them to vote for the offices for which they are entitled to vote and at the same time denying them an opportunity to vote upon matters upon which they have no right to vote. Each of these different kinds of voting is surrounded by safeguards which prevent illegal or defective voting. Means are provided whereby the voter in passing out resets the machine after voting, so that it is ready for the next voter.

In the drawings illustrating the principle of my invention and the best mode in which I have contemplated applying that principle, A is the frame of my registering-machine, which is supported in an upright position by standards or by any well-known means. A hollow beam P extends transversely from side to side of the upper part of the frame A, is secured thereto, and serves as a support for the sections B B' B$^2$ B$^3$ B$^5$. At the lower part of frame A is secured the plate P', which serves as a support for the lower ends of these sections. The back plate $b$ of each section is screwed to the supports P P'. (See Figs. 1 and 6.) At B$^4$, Fig. 1, one of the sections is shown removed. A casing $b^{15}$ (see Figs. 2 and 6) covers the face of the section and carries the cards N, bearing the names of the different candidates. (See Figs. 28 and 29.) At B$^6$, Fig. 2, the casing $b^{15}$ of one section is shown removed. The casing $b^{15}$ engages at its upper end in a rabbet $a$ in the frame A. The lower end of the casing $b^{15}$ is notched at $b^{16}$ to pass over the screw-eye $b^{17}$ and rests upon the lower part of the frame A. (See Figs. 32 and 33.) A rod R' passes through the screw-eyes $b^{17}$ and is removably secured in the side pieces of the frame A. This rod R' secures the casing $b^{15}$ in place, and when it is desired to remove the casing $b^{15}$ the rod R' is first with-drawn and then the casing $b^{15}$ is pulled out at the bottom. The rod R' may be replaced by padlock P², one padlock for each section or screw-eye, as shown in Fig. 61. A flat rib $b^2$ extends centrally in front of the back plate $b$ throughout its entire length and is secured to the back plate $b$ by the screws $b^3$, which are inclosed in the tubular washers $b'$. These tubular washers $b'$ keep the rib $b^2$ at the required distance from the back plate $b$, so that the bit of the key D, Fig. 40, cannot move in the space between the rib $b^2$ and the ratchet $b^{12}$ until the projections $d'$ $d^2$ on the key D (see Fig. 40) are in engagement with the sockets $b^{24}$ $b^{25}$ on the face of the ratchet $b^{12}$, Figs. 7 and 11. Furthermore, they prevent the rib $b^2$ from being unduly strained and serve to stiffen the construction. (See Fig. 6.) The rib $b^2$ is provided with double-slotted keyholes $b^4$ to admit the double-bitted key D. (See Figs. 2, 7, 40, 41, and 42.) A flat rib $b^6$ extends centrally along the rear face of the back plate $b$, to which it is secured by screws $b^7$, inclosed in tubular washers $b^{18}$. The end of the key-piece $b^5$, which is a portion of the main shaft of the register, projects slightly from the eye of the keyhole $b^4$ in the rib $b^2$, and thus serves to guide the key D upon its insertion. (See Fig. 6.) From the key-piece $b^5$ project the ears $b^8$, which move when the key-piece is turned in the space between the back plate $b$ and the rib $b^6$. (See Fig. 6.) The base of the key-piece is formed with a socket $b^{19}$ and is fitted free to rotate in the rib $b^6$ and the back plate $b$. (See Figs. 6, 43, 44, and 34.)

The locking-slide $b^9$ lies in contact with the rear face of the back plate $b$, to which it is secured by screw $b^{10}$, passing through slots $b^{11}$. (See Fig. 10.) One edge of the slide $b^9$ is notched to engage the ear $b^8$ of the key-piece $b^5$ when the latter is turned, and this notched edge lies under the rib $b^6$. The locking-slide $b^9$ projects below the back plate $b$ and bears upon its front face the projecting studs $b^{20}$ $b^{21}$ $b^{22}$. (See Figs. 3 and 4.)

Extending transversely across the machine parallel to one another and secured to the plate P' by studs are the interlocking slide F, the recording-slide E, and the resetting-slide G. The elevating-slide H is secured to the lower member of the frame A. (See Figs. 1, 3, and 4.) The recording-slide E is slotted at $e'$ to receive the studs $e$, which project from the face of plate P'. The studs $e^2$ project from the rear face of the slide E and bear normally against one arm of the bell-crank lever $e^3$. The other arm of the bell-crank lever $e^3$ normally rests upon the stud $b^{21}$ on the locking-slide $b^9$. Fulcrumed at $e^4$ is the bell-crank lever $e^5$, one end of which is slotted to receive a stud $e^{11}$, projecting from the slide E, and the other end of which is secured to the rod $e^6$. The other end of the rod $e^6$ is jointed to the bar $e^7$, which operates a counter X, which may be of any ordinary construction. Between the upper end of the rod $e^6$ and the casing is interposed a spring $e^8$. (See Figs. 3 and 1.) The interlocking slide F is notched on its lower side and rests upon the studs $f$, projecting from the plate P'. The slide F is provided with a rack $f'$, which meshes with a pinion $f^2$. The pinion $f^2$ is also in mesh with a rack $b^{23}$ on that locking-slide $b^{9\times}$ which is adjacent to the rack $f'$. The resetting-slide G is slotted at $g'$ to receive the studs $g$, which project from the plate P' and upon which the slide G slides. A pull-bar $g^2$ is removably fitted to the slide G at one end, and at the same end the slide G is notched to engage a projection $e^{10}$ from the recording-slide E. (See Fig. 3.) A spring $g^3$ restores the slide G to its normal position after being pulled out.

The elevating-slide H is secured to the lower part of the frame A and bears secured upon its upper surface the removable wedge-shaped pieces $h$. (See Figs. 3, 4, 45, and 46.) The slide H is slotted at $h^3$ to receive the screws $h^4$, which secure it to the frame A, and is provided at one end with the pull-bar $h'$. A spring $h^2$ is interposed between the other end of the slide H and the frame A. (See Figs. 1, 3, and 4.)

In front of the back plate $b$ a ratchet-wheel $b^{32}$ is secured upon the key-piece $b^5$, so as to rotate with it. The ratchet-wheel $b^{32}$ engages a pawl $b^{35}$, which is kept in place by the spring $b^{14}$. (See Fig. 17.) The front face of the ratchet-wheel is provided with two sockets $b^{24}$ $b^{25}$ to receive the projections $d'$ $d^2$ upon the key D. (See Figs. 40, 41, and 42.) Two studs $b^{26}$ $b^{27}$ project from the front face of the ratchet-wheel $b^{32}$ and parallel to the key-piece $b^5$. (See Fig. 6.) A flexible inextensible tape T (see Figs. 11 and 12) is threaded between the key-pieces $b^5$ $b^{30}$ and the tubular washers $b'$ of the screws $b^3$. The ends of the tape T are secured to the upper and lower washers $b'$. The tape T is adjusted with just enough slack to permit one, and only one, of the ratchet-wheels $b^{12}$ $b^{32}$ to be rotated at the same time. The projections $b^{26}$ $b^{27}$ bend the tape T and take up the slack when the ratchet $b^{12}$ or $b^{32}$ is rotated. (See Figs. 11 and 12.)

In case it is desired to permit more than one of the registers in any one section to be rotated the construction shown in Fig. 9 is provided. In Fig. 9 the rib $b^6$ is shown removed for clearness. The locking-slide $b^9$ is replaced by notched slides L, one notched slide L being adjacent to the ears $b^8$ of each key-piece X. The slides L are slotted to receive the studs $l^5$, projecting from the back plate $b$, and are provided on their notched edges with the toothed rack $l$. The rack $l$ meshes with a segmental gear $l'$, fast to which is an arm $l^6$, bearing at its outer end a grooved wheel $l^2$. (See Figs. 9, 36, 37, and 38.) Fast to back piece $b$ are grooved wheels $l^3$. Threaded between the grooved wheels $l^2$ $l^3$ is a flexible inextensible cord $l^7$, which is adjustably secured to the upper and lower ends of the back piece $b$, or it may, as is indicated by the dotted lines, be led off to another section when it is desired to combine sections together. The amount of slack in the cord $l^6$ is carefully adjusted so that when the given number of registers have been operated all the slack shall be taken up and the cord shall be drawn so taut as to prevent the operation of another register. A connecting-rib $l^8$ is used to connect any two or more of the notched slides L, and the slack of the cord $l^7$ is adjusted so as to provide for the simultaneous movement of the connected arms $l^6$, due to the operation of one register, or the grooved wheels $l^2$ may be removed from all but one of the connected arms $l^6$. Studs $l^4$ project from the rear face of the notched slides L into slots in a resetting-strip $l^9$, which is slotted to slide on the studs $l^4$ and $l^5$. The lower end of strip $l^9$ (not shown) is similar to that of slide $b^9$. It is to be understood that the tape T is also retained in this construction as well as in all others.

A register C is secured to the back plate $b$ by screws $c^9$, inclosed in sleeves $c^8$. (See Figs. 20 and 25.) The sleeve $c^8$ bears upon the back plate $b$ and projects slightly beyond the plate $c^{10}$ of the register C and protects the plate $c^{10}$ from any undue strain which might result from turning the screw $c^9$ up too much. The two plates $c^{10}$ $c^{11}$ of the register C are fastened together, as shown in Fig. 22. A hollow cylinder $c^{12}$ is fitted between the plates $c^{10}$ $c^{11}$, the ends of the cylinder fitting in holes in the plates. One end of the cylinder $c^{12}$ is screw-threaded to receive a screw $c^{13}$. The other end of the cylinder $c^{12}$ after being fitted in the hole in the plate $c^{11}$ is expanded or set up so as to secure it firmly in the plate $c^{11}$. Journaled in the plates $c^{10}$ $c^{11}$ are the arbors $c^{14}$, $c^{15}$, $c^{16}$, $c^{17}$, and $c^{18}$, of the train of gearing $c$, $c'$, $c^2$, $c^3$, $c^4$, $c^5$, $c^6$ and $c^7$. (See Figs. 21 and 20.) The arbor $c^{14}$ of the pinion $c$ projects from the plate $c^{10}$ and fits snugly in the socket $b^{19}$ of the key-piece $b^5$ to form the main shaft of the register, so that the turning of the key-piece $b^5$ turns the pinion $c$. (See Fig. 6.) The division of the main shaft of the register into two parts is for reasons of mechanical construction, and the main shaft may be made in one piece. The pinion $c$ meshes with a spur-gear $c'$, fast upon the arbor $c^{15}$, upon which is a single-toothed wheel $c^2$, which engages and turns the notched wheel $c^3$ one tooth each revolution of the gear $c'$. By a similar construction the single-toothed wheel $c^4$ on the arbor $c^{16}$ engages and turns the notched wheel $c^5$ one tooth for every revolution of the notched wheel $c^3$, and the notched wheel $c^7$ is moved one tooth for every revolution of the notched wheel $c^5$, which is fast upon the same arbor $c^{17}$ with the single-toothed wheel $c^6$. This is the Geneva movement or stop-wheel movement. The face-plate $c^{10}$ of the register C is provided with suitable indexes $c^{19}$ (see Fig. 5) and index-fingers $c^{20}$. The index-fingers are fixed upon the arbors $c^{15}$ $c^{16}$ $c^{17}$ $c^{18}$ by drilling a socket $c^{21}$ in one end of the arbor, passing the end of the arbor through the eye of the finger $c^{20}$, and then upsetting and expanding the end of the arbor over the finger. (See Fig. 26.) This is the preferable method, as it prevents the finger from being moved without turning the arbor; but the bored end of the arbor may be screw-threaded and the finger secured to the arbor by screws. (See Fig. 5.) The arbor $c^{15}$ projects from the plate $c^{11}$, and by removing the register and turning this arbor by means of a key fitted thereto the register C may be rapidly reset. The register C must be removed from the back plate $b$ in order to be reset, as otherwise the arbor $c^{15}$ is not accessible.

A card-box K is secured to the upper part of the back plate $b$ and serves to hold the cards $k$. A follower $k'$, the ends of which slide in slots $k^2$ in the sides of the card-box K, is held in contact with the cards by the springs $k^3$ $k^4$, secured to the back plate $b$ and the ends of the follower $k'$. The slots $k^2$ are provided with a recess $k^{12}$, in which to hold the ends of the follower $k'$ when the supply of cards is to be replenished. The base of the key-piece $b^{30}$ is fitted to rotate in the plate $k^{11}$ (see Figs. 5 and 6) and has secured to it a pinion $k^5$. The pinion $k^5$ meshes with the spur-gear $k^6$, which meshes with the pinion $k^7$, fast upon the shaft of which is a bevel-gear $k^8$. The bevel-gear $k^9$ meshes with the bevel-gear $k^8$ and bears fast upon its shaft the star-wheel $k^{10}$. Some of the teeth of the star-wheel $k^{10}$ come in contact with the under surface of the lowermost card when it is rotated. Opposite the bottom of the card-box K is a slit $b^{31}$ in the casing $b^{15}$, which permits the egress of a card forced outwardly by the turning of the star-wheel $k^{10}$. A space $k^{13}$ at the bottom of the card-box K is of just sufficient size to allow only one card to be forced out by one actuation of the key-piece $b^{30}$. The key-piece $b^{30}$ is provided with a ratchet-wheel $b^{12}$ and ears $b^8$. The ratchet-wheel $b^{12}$ and its pawl $b^{13}$ (see Fig. 17) differ from the ratchet-wheel $b^{32}$ and its pawl $b^{33}$ in the shape of the teeth and the engaging end of the pawl. The ratchet-wheel $b^{12}$ cannot be turned backward; but the ratchet-wheel $b^{32}$ may be rotated in either direction. The ratchet-wheel $b^{12}$ and its pawl $b^{13}$ are always used with the key-piece $b^{30}$ of the card-delivering mechanism.

To indicate what key-piece has been turned and to prevent the turning backward of the main shaft of any register other than the one just actuated, wheel $b^{32}$ and pawl $b^{33}$ allowing the register just actuated to be turned backward, as above explained, (see Fig. 14,) notched plates M are secured to the back plate $b$ and are free to slide upon the locking-slide $b^9$. Studs $m$ project from the locking-slide $b^9$ into slots $m'$ in the plates M. The notches in the plate M and the locking-slide $b^9$ are similar and in their normal position cover each other, so as to coincide and form one notch. To each plate M is attached one end of a cord $m^2$, the other end of which is attached to a lever $m^6$. The lever $m^6$ holds a card $m^4$ suitably inscribed and is held in its lowered or normal position against the pull of the spring $m^5$. The lever $m^2$ is fulcrumed upon the stud $m^3$, which is secured to the frame A of the machine.

In front of each key-piece secured to the casing $b^{15}$ is a card N, (see Figs. 2, 28, and 29,) suitably inscribed. The card N is provided with an aperture $n$, through which the escutcheon $n'$ of the keyhole in the casing $b^{15}$ projects. A frame $n^2$, of sheet metal, is placed over the card N and is fastened on one side to the casing $b^{15}$, as at $n^3$, Fig. 29. The other side of the frame $n^2$ is held in place by a rod R, passing through screw-eyes $r$, fast in the casing $b^{15}$. The cards N are thus securely held in place, and tampering with them is prevented, for the rod R extends the whole length of the casing $b^{15}$ and cannot be removed until the casing $b^{15}$ is removed. The casing $b^{15}$ is held locked in position by the rod R', which extends transversely across the bottom of the frame, or by padlock $P^2$, Fig. 61, the bow of which engages the screw-eye $b^{17}$.

In Fig. 8 the locking-slide is made in sections V V', which are capable of independent movement. Studs $v$ project from the face of the notched slides V V' into slots $v'$ in the resetting-strip $v^2$. The sections V V' are slotted to receive studs $v^3$, which project from the back plate $b$ into slots in the resetting-slide $v^2$. The lower end (not shown) of the resetting-strip $v^2$ is similar to the lower end of the locking-slide $b^9$, except that it is not provided with the stud $b^{20}$.

The key D, Figs. 40 and 41, has a tubular shank $d$ and a solid double bit $d^3$ with projections $d'$ $d^2$. The tubular shank is notched at one end to receive the pin $b^{34}$, which secures the ratchet-wheels in place on the key-pieces $b^5$ $b^{30}$. (See Fig. 7.) The projections $d'$ $d^2$ enter corresponding sockets $b^{24}$ $b^{25}$ in the ratchet-wheels $b^{12}$ $b^{32}$, and the tubular shank passes over the end of key-pieces $b^5$ $b^{30}$. A special key, as shown by the dotted line in Fig. 42, may be made by decreasing the length of the tubular portion $d$, the key-pieces being made of a corresponding shorter length, as shown in dotted lines, Fig. 43. The projections on the bit in case of a key having a short tubular portion cannot engage in the sockets $b^{24}$ $b^{25}$ in the ratchet-wheel on the ordinary long key-pieces. (See dotted lines, Figs. 42 and 43.)

In Fig. 48, Y is a table, on which is mounted the frame A of the machine. Within the table Y slides a frame $y$, in the center of which is a fixed pintle $y'$. Free to rotate upon the pintle $y'$ as an axis is an annular box $y^2$, which is divided by radial partitions into a suitable number of compartments. The outer wall of the annular box $y^2$ projects below the bottom of the box and is notched at its lower edge. (See Figs. 49, 50, and 53.) An arm $y^3$, free to rotate about the pintle $y$, has secured to its lower face a flat spring $y^4$, which bears at its outer end a projection $y^5$. This projection $y^5$ projects upward through a slot in the arm $y^3$ and engages the notches in the lower edge of the box $y^2$. (See Figs. 48, 49, 54, and 55.) Fulcrumed in the table Y at $y^6$ is the lever $y^7$, the other end of which is slotted to engage a stud $y^8$, projecting from the pull-bar $g^2$ of the resetting-slide G. (See Figs. 1, 3, 51, and 57.) The lever $y^7$ works in a slot in the table Y and is connected to the arm $y^3$ by means of links $y^9$, $y^{11}$, and $y^{13}$ and the bell-crank levers $y^{10}$ and $y^{12}$. Fast to the frame $y$ is a stop-piece $y^{14}$, which prevents a retrograde movement of the annular box $y^2$.

The resetting-slide G is actuated by the voter's passing out of the booth through the mechanism shown in Figs. 56 and 57. One end of the link $g^4$ is removably secured to the end of the pull-bar $g^2$ of the resetting-slide G, the pin $g^5$ acting as a pivot about which the link moves. The other end of the link $g^4$ is secured to the crank-arm $g^6$ of the pintle $g^7$, which rotates in a socket $g^8$ in the center of the box $g^9$, secured to the table Y. One end of a spring $g^{10}$ passes transversely through the lower end of the pintle $g^7$ and serves to hold it in its socket $g^8$. The other end of the spring $g^{10}$ is fastened to the wall of the box $g^9$. An arm $g^{11}$ is fitted free to rotate about the pintle $g^7$ and is formed with a vertical hole, through which the end $g^{12}$ of the spring $g^{13}$ is passed. The other end of the spring $g^{13}$ is passed through a hole in the upper end of the pintle $g^7$ and is free to move lengthwise therein. Studs $g^{14}$ in the top of the box $g^9$ mark the limits of travel of the crank-arm $g^6$. An arm $g^{15}$ of the counter $g^{16}$ projects into the line of travel of the lever $y^7$. This counter keeps a record of the number of voters who pass out.

In Figs. 58, 59, and 60 the knob $b^{35}$ is shown secured to the key-piece $b^5$, which forms one part of the main shaft of the register C. By this modification the use of the key D, Fig. 40, is dispensed with.

The mode of operation of my machine is as follows: For convenience in registering the votes cast at an election the names of all the candidates for a given office are preferably arranged in the same section, and one register in the section is allotted to each candidate for that office. The card N in front of the register bears the name of the candidate to whom the register is assigned. The various party tickets or straight tickets are preferably arranged in the same section, and one register in that section is allotted to each party ticket. The card N in front of the register bears the name of the party to which the register is assigned—thus "Republican party, straight ticket." Where questions are to be voted upon—e. g., the license question—a separate section is preferably reserved for registering this vote, and the construction of the section for such purposes is shown in Fig. 8. Two registers are generally assigned to the registering of the vote upon any one question—one register for the "yes" vote, the other for the "no" vote. The card N in front of the register has printed upon it the question and the answer. Where more than one vacancy is to be filled in any given office—e.g., school committeeman—and therefore more than one candidate is to be elected to that office, or a given number of vacancies are to be filled from a limited number of nominees, or what is known as "selective" voting, the construction shown in Fig. 9 is preferably used. While the foregoing arrangement is the preferred one, I do not limit myself to any special arrangement. One object is to prevent "repeating" and double voting or the voting more than once for the same office either by voting for the same candidate more than once or by voting for two or more different candidates for the same office. The voter is given a key D, Fig. 40, which fits all the key-pieces of the register assigned to the candidates for whom he is entitled to the vote or to the questions upon which he is entitled to vote. In case of voters entitled to vote only for certain offices, as in case of female voters and poll-tax payers, the voter may be given a special key, (see the dotted lines, Figs. 42 and 43,) which will fit only the key-pieces of the registers assigned to the candidates for whom he is entitled to vote or the questions upon which he is entitled to vote, or the elevating-slide H may be drawn out, raising the locking-slides $b^9$ in those sections reserved for the offices for which the voter is not entitled to vote. The voter inserts the key D into the proper keyhole, as designated by the card N, the projections $d'$ $d^2$ on the bit $d^3$ entering corresponding sockets $b^{24}$ $b^{25}$ in the face of the ratchet-wheel $b^{32}$. He then turns the key D to the right, the only direction in which he can turn it, thus turning the ratchet-wheel $b^{32}$, the ears $b^8$, and the pinion $c$ of the register C. The vote is thus recorded on the register assigned to the candidate voted for. The tape T prevents the voter from using two or more keys simultaneously, voting twice for the same office. The locking-slide $b^9$ being in its lowered or normal position is raised by the lower ear $b^8$ of the key-piece $b^5$ engaging in the notch adjacent to it, while the register is prevented from being turned backward by the locking-slide $b^9$, which lies in the path of the upper ear $b^8$. The plate M adjacent to the key-piece just turned is raised with the slide $b^9$, and the notch in plate M remains coincident with the notch in the slide $b^9$ to form one notch, which now registers with the upper ear of the key-piece. The other plates M retain their position while the slide $b^9$ moves up under them. (See Fig. 14.) The slack in the cord $m^2$, connected to the plate M which has been raised, is taken up by the spring $m^5$ pulling down one end of the lever $m^6$, and thereby raising the indicator-card $m^4$ on the other end into view. The voter is thus enabled to verify his vote, and if he has made a mistake he may correct it by turning the same key-piece to the left, thereby restoring the slide $b^9$ and the plate M to their original position and counting off the vote on the register C. The section is thereby restored to its original condition, and the voter may now vote for any candidate whom he prefers for that office. The ratchet-wheel $b^{32}$ is in this case provided with teeth and a pawl, which allow the ratchet-wheel to be turned in either direction. (See Fig. 17.) The slide $b^9$ being in its raised position, the only key-piece which can be turned is the one by which the slide $b^9$ has just been raised, and that key-piece can be turned only to the left. The other key-pieces are prevented from being turned to the right by the slide $b^9$ and to the left by the plates M. (See Figs. 14 and 18.) The voter is thus prevented from voting for the same candidate more than once or for two or more different candidates for the same office and from turning backward the register of any candidate other than the one for whom he has just voted. When the slide $b^9$ is in its lowered position, none of the key-pieces in that section can be turned to the left. (See upper part of Fig. 14.) Thus a voter not desiring to vote is prevented from turning back the register of any candidate. The plates M or the indicator-cards $m^4$, or both, may be omitted from the construction. In that case the ratchet-wheel $b^{12}$ must have teeth and a pawl $b^{13}$ of the shape shown in Fig. 7, which prevent the key-pieces' being turned backward and the voter's changing his vote. When the slide $b^9$ is raised, the stud $b^{21}$ rotates the bell-crank lever $e^3$ on its fulcrum, and thereby causes the recording-slide E to be pushed endwise. The counter X, which records the total number of persons voting, is operated by this movement of the slide E. The counter X is of any ordinary form of construction. The slide E is not moved again until it is reset by the resetting-slide G, and this is not done until the voter has left the machine. (See Figs. 3, 4, and 56.)

In case a voter votes the straight ticket he is prevented from again voting for an office that is upon that ticket unless he counts off his previous vote, and if a voter votes separately for a candidate for any office upon the straight ticket he is prevented from subsequently voting a straight ticket unless he counts off his previous vote. These results are accomplished in the following way: The locking-slide $b^{9\times}$ of the straight-ticket section is provided with a rack $b^{23}$, (see Fig. 4,) which meshes with a gear $f^2$. A rack $f'$ on the end of the interlocking slide F is also in mesh with the gear $f^2$. When the slide $b^{9\times}$ is raised by the voter's first voting the straight ticket, the gear $f^2$ rotates and moves the interlocking slide F into the position shown by the dotted lines in Fig. 4. (See also Fig. 3.) In this position the slide bears upon the studs $b^{20}$, projecting from the slides $b^9$ of the other sections, and prevents these slides from being raised by the voter. In case the voter first votes separately for a candidate the slide $b^9$ of that section is raised and carries the stud $b^{20}$ into engagement with the notch on the lower side of the interlocking slide F. The stud $b^{20}$ in this position prevents the slide F from being moved to the right and so prevents the slide $b^{9\times}$ of the straight-ticket section from being raised by the voter. This same construction prevents the voter's simultaneously voting in the straight-ticket section and in a section reserved for an office upon that ticket. Where questions are to be voted upon, the locking-slide $b^9$ is replaced by notched sections, as shown in Fig. 8. The interlocking slide F does not come into contact with these notched sections, and one who has voted for a candidate separately or for the straight ticket may nevertheless vote upon the questions. Ordinarily two key-pieces are allotted to each question; but this may be varied at will by providing a notched slide with the required number of notches.

A voter may desire to vote for a person to whom no register is assigned. In that case he inserts his key and turns the key-piece $b^{30}$, thereby procuring a card upon which is printed the name of the office for which the section from which the card is taken is reserved. If, for example, the card is taken from the card-box of the section reserved for the office of governor, the card will be printed "Independent vote for governor." As the voter can get only one card from any one section, he is prevented by the printing on the card from casting more than one vote for the same office, except in the case of selective voting, when he may vote for the allowed number of candidates on a single card, or, if the number of sections assigned to the office is the same as the allowed number of candidates, he procures a card from each section. The voter writes the name of his candidate upon the card and deposits it in a receptacle provided for it. (See Fig. 47.)

Certain classes of voters, as poll-tax payers and female voters, are not allowed to vote for candidates for certain offices. To make provision for such voters, wedge-shaped pieces $h$ are secured to the elevating-slide H in proper position, so that when the handle $h'$ is pulled out the wedge-shaped pieces $h$ abut against the studs $b^{22}$ on the slides $b^9$ $b^{9\times}$ and raise the slides $b^9$ $b^{9\times}$ in those sections which are assigned to the offices for which the voter is not entitled to vote. The spring $h^2$ restores the slide H to its first position when the handle $h'$ is released. These voters may also be provided with special keys, as before explained.

In cases where a voter is allowed to vote for a given number of candidates out of a limited number of nominees, or selective voting, as, where seven aldermen are to be elected and each party is allowed to name twelve nominees, the construction shown in Fig. 9 is used in the section reserved for that office. The voter turns the key-pieces of the allowed number of candidates and can turn no more, for the slack in the cord $l^7$ is so adjusted that it is then taken up by the arms $l^6$ bending the cord $l^7$. In case the same person is the candidate of more than one party for such an office the connecting-link $l^8$ is used to connect the notched slides L adjacent to the key-pieces which are assigned to this candidate. Such a candidate is known as an "indorsed" candidate, and he is assigned a separate key-piece for each party nomination that he holds. By reason of the connection $l^8$ the turning of one of the key-pieces assigned to such a candidate causes the connected arms $l^6$ to be rotated. The grooved wheels $l^2$ may be removed from all but one of the connected arms $l^6$, or the slack in the cord $l^7$ may be adjusted to suit the particular case, so that the voter may vote for the allowed number of candidates regardless of the connection $l^8$. In case the voter wishes to vote for no candidate to whom a key-piece has been assigned, he may by turning the key-piece $b^{30}$ in each section assigned to the office (in the case taken, alderman) obtain as many cards as there are candidates to be elected to the office, (in the case taken, seven.) The voter is not allowed to vote twice for the same candidate for the same office, and should he write the same name on more than one card, deposit the cards, and so attempt to vote more than once for the same person for the same office the illegal vote will be detected by means of the mechanism shown in Fig. 47. The voter drops the cards, properly inscribed, through the slit $y^{15}$ in the table Y into the compartment of the annular box $y^2$ which happens to be under the slit at that time. When any voter leaves the booth, the resetting-slide G is pulled outward and by means of the lever $y^7$, links $y^9$, $y^{11}$, and $y^{13}$, and the bell-crank levers $y^{10}$ and $y^{12}$ moves the arm $y^3$ about the pintle $y'$. The annular box $y^2$ is pushed around by the movement of the projection $y^5$, which is engaged in a notch in the lower edge of the wall of the box $y^2$. In this way the card-receptacle is moved one step by every voter, thereby bringing the next empty compartment under the slit $y^{15}$, and this movement of the card-receptacle is occasioned by the passing out of any voter regardless of whether he used the card-receptacle. In this way the cards deposited by any voter are kept separate from the cards deposited by any other voter. After the annular box $y^2$ has made a complete revolution, of which a suitable signal (not shown) gives notice, the link $y^{13}$ is disconnected from the arm $y^3$, the frame $y$ is drawn out, and the box $y^2$ replaced by an empty one. An examination of the cards in each compartment will reveal any illegal voting that may have been done. The resetting-slide G is restored to its normal position by the spring $g^3$ and by its inward movement forces the projection $y^5$ into engagement with the notch next in rear. The stop-piece $y^{14}$ prevents the retrograde movement of the box $y^2$ during this change of position of the projection $y^5$. The arm $g^{11}$ closes the exit-passage from the booth which incloses the machine, and when the voter passes out he pushes the arm $g^{11}$ into the position shown in dotted lines in Fig. 56. The crank-arm $g^6$ is brought up against the stud $g^{14}$ when the resetting-bar G is pulled out. When the crank-arm $g^6$ has reached the limit of its travel, the arm $g^{11}$ has not been moved sufficiently to permit the passage of a person of ordinary size. This adjustment is made so as to insure the resetting of the machine by the exit of the voter. A further movement of the arm $g^{11}$ is made against the tension of the spring $g^{13}$, and the arm $g^{11}$ in this further movement rotates about the pintle $g^7$. The arm $g^{11}$ is restored to its normal or closing position by means of the springs $g^3$, Fig. 3, $g^{10}$, and $g^{13}$.

When the resetting-slide G is pulled out, the inclined surfaces on the lower edge of the resetting-slide G bear against the studs $b^{22}$ on the lower end of the locking-slides $b^9$ $b^{9\times}$ and of the resetting-strips $l^9$ and $v^2$, (not shown,) which have been raised. The locking-slides $b^9$ $b^{9\times}$ and the resetting-strips $l^9$ and $v^2$ are thereby drawn down to their normal or lowered position and the interlocking slide F is restored to its normal position if moved therefrom by the raising of the locking-slide $b^{9\times}$ of the straight-ticket section. All parts of the machine are thus unlocked as regards forward movement.

While I have set forth many details of construction, I do not intend to limit my invention or any of the novel features thereof to details, for it will be obvious to all skilled in the art of registering-machines that the described embodiment of the various features of my invention may be varied in mechanical respects without departing from the essence of the invention. My intention is to patent each and every feature of my invention in the broadest manner that is legally permissible. While I have described this particular embodiment of my invention in connection with voting-machines, I do not intend to limit my invention to that or any other one particular use, the leading features of my invention being capable of and intended for embodiment in a great variety of registering-machines, notably cash-registers.

What I claim is—

1. In a registering-machine, the combination of a back plate which supports a plurality of rotary registers; said rotary registers mounted upon said back plate; an actuating-pinion for each register; a shaft for each actuating-pinion, said shaft being provided with ears; a tape adjusted in close proximity to said pinion-shafts and made taut by the rotation of said actuating-pinion shafts; a locking-slide common to all said register-actuators and moved by the rotation of said actuating-pinion shafts; a plurality of slidable plates, one for each register-actuator, and moved by the rotation of said actuating-pinion shafts; and a resetting-slide which engages and moves the locking-slide to its original position.

2. In a registering-machine, the combination of a supporting back plate; a plurality of rotary registers mounted upon said back plate, said registers being made up of a plurality of intermeshing counting-disks, indicating mechanism, and an actuating-pinion in mesh with one of said counting-disks; the shafts of said actuating-pinions, provided with ears; a plurality of wheels provided with projecting studs, one of which is fast upon each of said pinion-shafts; a tape secured in close proximity to said pinion-shafts and which prevents the actuation of more than one of said registers at the same time; a notched locking-slide engaging the ears upon said pinion-shafts and provided with a projecting stud engaging a resetting-slide; a plurality of supplementary slidable notched plates, one of said plates being provided for each of said register-actuators and engaging the ears upon the pinion-shaft of the said register; a rib formed with keyholes and extending longitudinally along and at a fixed distance from the said supporting back plate; a key which turns said pinion-shaft; and a resetting-slide which engages the projecting stud on said notched locking-slide and thereby resets the said notched locking-slide and that one of said notched slidable plates which has been moved by the actuation of one of said registers.

3. In a registering-machine, the combination of a back plate which supports a plurality of rotary registers; said rotary registers mounted upon said back plate; an actuating-pinion for each register; a shaft for each actuating-pinion, said shaft being provided with ears; a tape adjusted in close proximity to said pinion-shafts and made taut by the rotation of said actuating-pinion shafts; a locking-slide common to all said register-actuators, and moved by the rotation of said actuating-pinion shafts; a plurality of slidable plates, one for each register-actuator, and moved by the rotation of said actuating-pinion shafts; a resetting-slide which engages and moves the locking-slide to its original position; a totalizer which registers the total number of times the registering-machine has been used; an actuating-slide for said totalizer; and means which operatively connect said actuating-slide with said locking-slide.

4. In a registering-machine, the combination of a supporting back plate; a plurality of rotary registers mounted upon said back plate, said registers being made up of a plurality of intermeshing counting-disks, indicating mechanism and an actuating-pinion in mesh with said counting-disks; the shafts of said actuating-pinions, provided with ears; a plurality of wheels, one of which is fast upon each of said pinion-shafts and provided with projecting studs which engage and flex to tautness a tape; said tape adjusted in close proximity to said pinion-shafts and flexed to tautness by the rotation of said pinion-shafts; a notched locking-slide engaging the ears upon said pinion-shafts and provided at its lower end with projecting studs; a plurality of supplementary slidable notched plates, one of said plates being provided for each of said register-actuators, and engaging the ears upon the pinion-shaft of said register; a rib formed with keyholes and extending longitudinally along and at a fixed distance from the said supporting back plate; a key which turns said pinion-shaft; a recording-slide formed with projecting studs; a totalizer which records the total number of times the registering-machine has been used; connecting mechanism between said recording-slide and said totalizer; a bell-crank lever, one arm of which contacts with a projecting stud on said notched locking-slide and the other arm of which contacts with a projecting stud on said recording-slide; and a resetting-slide which engages a projecting stud on said notched locking-slide and a projection on said recording-slide and thereby resets the said notched locking-slide, the said recording-slide and that of one of said supplementary notched slidable plates which has been moved by the actuation of one of said registers.

5. In a registering-machine, the combination of a supporting back plate; a plurality of rotary registers; an actuating-pinion for each rotary register; the shaft of said actuating-pinion, provided with ears; a tape adjusted in close proximity to said pinion-shafts and made taut by the rotation of said pinion-shafts; a plurality of locking-slides; a resetting-strip common to all said locking-slides; and a resetting-slide which actuates said resetting-strip.

6. In a registering-machine, the combination of a supporting back plate; a plurality of rotary registers mounted upon said back plate, said registers being made up of a plurality of intermeshing counting-disks, indicating mechanism and an actuating-pinion in mesh with said counting-disks; the shafts of said actuating-pinions, provided with ears; a plurality of wheels, provided with projecting studs, one of which is fast on each of said pinion-shafts; a tape secured in close proximity to said pinion-shafts and which prevents the actuation of more than one of said registers at the same time; a plurality of notched locking-slides provided with slots which receive studs projecting from said supporting back plate, the notches in said locking-slides engaging ears upon said pinion-shafts; a resetting-strip formed with slots which receive studs projecting from the said supporting back plate and studs projecting from the said notched locking-slides and provided with studs which engage a resetting-slide; a rib formed with keyholes and extending longitudinally along and at a fixed distance from the said supporting back plate; a key which turns said pinion-shaft; and a resetting-slide which engages a projecting stud on said resetting-strip and thereby resets the said resetting-strip and the said notched locking-slides to their original position after they have been moved therefrom by the actuation of the register.

7. In a registering-machine, the combination of a back plate which supports a plurality of rotary registers; said rotary registers mounted upon said back plate; an actuating-pinion for each register; a shaft for each actuating-pinion, said shaft being provided with ears; a tape adjusted in close proximity to said pinion-shafts and made taut by the rotation of said actuating-pinion shafts; a locking-slide common to all said register-actuators, and moved by the rotation of said actuating-pinion shafts; a plurality of slidable plates, one for each register-actuator, and moved by the rotation of said actuating-pinion shafts; means which prevent the actuation of more than a predetermined number of said registers; a resetting-strip which resets said preventing means to their original position; and a resetting-slide which actuates said resetting-strip.

8. In a registering-machine, the combination of a supporting back plate; a plurality of rotary registers mounted upon said back plate, said registers being made up of a plurality of intermeshing counting-disks, indicating mechanism and an actuating-pinion in mesh with said counting-disks; the shafts of said actuating-pinions, provided with ears; a plurality of wheels provided with projecting studs, one of which is fast upon each of said pinion-shafts; a tape secured in close proximity to said pinion-shafts and which prevents the actuation of more than one of said registers at the same time; a plurality of notched slidable plates, one of said notched plates being provided for each register-actuator, said plates engaging the ears upon said pinion-shafts, being formed with slots which receive studs projecting from said supporting back plate, and formed with a toothed rack; a plurality of toothed wheels in mesh with said toothed racks; a plurality of arms, one arm being fastened to each of said pinions; a plurality of disks; a cord adjusted in close proximity to said disks, and which prevents the actuation of more than a predetermined number of said registers; a resetting-strip formed with slots which receive studs projecting from said supporting back plate and studs projecting from said slidable notched plates and provided with studs which engage a resetting-slide; a rib formed with keyholes and extending longitudinally along and at a fixed distance from said supporting back plate; a key which turns said pinion-shaft; and a resetting-slide which engages a projecting stud on said resetting-strip and thereby resets the said resetting-strip and the said notched slidable plates to their original position after they have been moved therefrom by the actuation of the registers.

9. In a registering-machine, the combination of a supporting back plate; a plurality of rotary registers mounted on said back plate; an actuating-pinion for each register; a card-delivering mechanism; an actuating-pinion for said card-delivering mechanism; the shafts of said actuating-pinions, provided with ears; a tape secured in close proximity to said pinion-shafts; a locking-slide common to said register-actuators and said card-delivering mechanism; a plurality of slidable plates; and a resetting-slide.

10. In a registering-machine, the combination of a supporting back plate; a plurality of rotary registers mounted upon said back plate, said registers being made up of a plurality of intermeshing counting-disks, indicating mechanism and an actuating-pinion in mesh with said counting-disks; a card-delivering mechanism mounted upon said back plate, said card-delivering mechanism being made up of a slotted card-box, a spring-controlled follower slidable in slots in said card-box, springs which control said follower, a shaft journaled in said card-box, star-wheels mounted fast upon said card-box shaft, a gear mounted fast upon said card-box shaft, an actuating-pinion, the shaft of said actuating-pinion provided with ears, and a train of gearing connecting said pinion with the gear fast upon said card-box shaft; a ratchet-wheel fast upon said actuating-pinion shaft; a pawl engaging said ratchet-wheel and preventing backward rotation of said ratchet-wheel; a plurality of wheels provided with projecting studs, one of which is fast upon the pinion-shaft of each of said registers; the actuating-pinion shafts of said registers, provided with ears; a tape secured in close proximity to said pinion-shafts and which prevents the rotation of more than one pinion-shaft at the same time; a notched locking-slide engaging the ears upon said pinion-shaft and provided with a projecting stud which engages a resetting-slide; a plurality of supplementary slidable notched plates, one of said plates being provided for each of said register-actuators and engaging the ears upon the pinion-shaft of the said register; a rib formed with keyholes and extending longitudinally along and at a fixed distance from the said supporting back plate; a key which turns said pinion-shaft; and a resetting-slide which engages the projecting stud on said notched locking-slide and thereby resets the said notched locking-slide to its original position.

11. In a registering-machine, the combination of a supporting back plate; a plurality of rotary registers mounted upon said back plate; an actuating-pinion for each register; the shaft of said actuating-pinion, provided with ears; a tape adjusted in close proximity to said pinion-shafts and made taut by the rotation of said pinion-shafts; a locking-slide common to said register-actuators; a plurality of slidable plates; means to indicate which register has been actuated; and a resetting-slide.

12. In a registering-machine, the combination of a supporting back plate; a plurality of rotary registers mounted upon said back plate, said registers being made up of a plurality of intermeshing counting-disks, indicating mechanism and an actuating-pinion in mesh with said counting-disks; the shafts of said actuating-pinions, provided with ears; a plurality of wheels provided with projecting studs, one of which is fast upon each of said pinion-shafts; a tape secured in close proximity to said pinion-shafts and which prevents the actuation of more than one of said registers at the same time; a notched locking-slide engaging the ears upon said pinion-shaft and provided with a projecting stud engaging a resetting-slide; a plurality of supplementary slidable notched plates, one of said plates being provided for each of said register-actuators and engaging the ears upon the pinion-shaft of said register; an indicating mechanism comprising a plurality of spring-controlled levers each bearing an indicator-card; a plurality of springs controlling said levers; and a plurality of cords, one cord being provided for each register, one end of said cord being fast to one of said slidable notched plates and the other end of said cord being fast to one of said levers; a rib formed with keyholes and extending longitudinally along and at a fixed distance from said supporting back plate; a key which turns said pinion-shaft; and a resetting-slide which engages the projecting studs on said notched locking-slide and resets said notched locking-slide and that one of said slidable notched plates which has been moved by the actuation of the said register.

13. In a registering-machine, the combination of a supporting back plate; a plurality of rotary registers mounted on said back plate; an actuating-pinion for each register; a card-delivering mechanism; an actuating-pinion for said card-delivering mechanism; the shafts of said actuating-pinions provided with ears; a tape secured in close proximity to said pinion-shafts; a locking-slide common to said register-actuators and said card-delivering mechanism; a plurality of slidable notched plates; a table-support inclosing a card-receptacle; said card-receptacle; means which give a step-by-step movement to said card-receptacle; and a resetting-slide.

14. In a registering-machine, the combination of a supporting back plate; a plurality of rotary registers, said registers being made up of a plurality of intermeshing counting-disks, indicating mechanism and an actuating-pinion; the shafts of said actuating-pinions, provided with ears; a plurality of wheels provided with projecting studs, one of which is fast upon each of said pinion-shafts; a tape secured in close proximity to said pinion-shafts and which prevents the actuation of more than one of said registers at the same time; a card-delivering mechanism mounted upon said supporting back plate, said card-delivering mechanism being made up of a slotted card-box, a spring-controlled follower slidable in slots in said card-box, springs to control said follower; a shaft journaled in said card-box, star-wheels mounted fast upon said card-box shaft, a gear mounted fast upon said card-box shaft, an actuating-pinion, the shaft of said actuating-pinion provided with ears, and a train of gearing connecting said pinion with the gear fast upon said card-box shaft; a ratchet-wheel fast upon the actuating-pinion shaft of said card-delivering mechanism; a pawl adapted to engage said ratchet-wheel and prevent backward rotation thereof; a notched locking-slide notched to engage the ears upon said pinion-shafts and provided with a projecting stud to engage a resetting-slide; a plurality of supplementary slidable notched plates, one of said plates being provided for each of said register-actuators and engaging the ears upon the pinion-shaft of said register; a rib formed with keyholes and extending longitudinally along and at a fixed distance from said supporting back plate; a key fitted to engage and turn said pinion-shafts; a resetting-slide which engages the projecting stud on said notched locking-slide and thereby resets said notched locking-slide and that one of said slidable notched plates which has been moved by the actuation of the register; a table-support inclosing a rotary card-receptacle; said rotary card-receptacle divided into compartments, mounted in said table-support, and formed with notched projections; an arm which engages said notched projections; a guard to prevent the backward rotation of said rotary card-receptacle; and mechanism connecting said resetting-slide with said arm.

15. In a registering-machine, the combination of a supporting back plate; a plurality of rotary registers mounted upon said plate; an actuating-pinion for each register; the shaft of said actuating-pinion, provided with ears; a tape adjusted in close proximity to said pinion-shafts and made taut by the rotation of said pinion-shafts; a locking-slide common to said register-actuators; a plurality of slidable plates; a resetting-slide; a gate-support; a gate; and means which connect said gate with said resetting-slide and which actuate the slide through the movement of the gate.

16. In a registering-machine, the combination of a supporting back plate; a plurality of rotary registers mounted upon said back plate, said registers being made up of a plurality of intermeshing counting-disks, indicating mechanism and an actuating-pinion in mesh with said counting-disks; the shafts of said actuating-pinions provided with ears; a plurality of wheels provided with projecting studs, one of which is fast upon each of said pinion-shafts; a tape secured in close proximity to said pinion-shafts and which prevents the actuation of more than one of said registers at the same time; a notched locking-slide engaging the ears upon said pinion-shafts and provided with a projecting stud to engage a resetting-slide; a plurality of supplementary slidable notched plates, one of said plates being provided for each of said register-actuators and engaging the ears upon the pinion-shaft of said register; a rib formed with keyholes and extending longitudinally along and at a fixed distance from the said supporting back plate; a key which turns said pinion-shaft; a resetting-slide which engages the projecting stud on said notched locking-slide and thereby resets said notched locking-slide and that one of said slidable notched plates which has been moved by the actuation of the register; a gate-lever; a gate-support; a shaft journaled in said gate-support and provided with a boss; studs projecting from said gate-support and limiting the rotation of said shaft; a spring, one end of which is attached to said shaft and the other end of which is attached to the said gate-lever; a boss projecting from said shaft; and a link connecting said boss with said resetting-slide.

17. In a registering-machine, the combination of a supporting back plate; a plurality of groups of rotary registers; an actuating-pinion for each register; the shafts of said actuating-pinions provided with ears; a tape for each group of registers, said tape being adjusted in close proximity to the pinion-shafts of its group and made taut by the rotation of said pinion-shafts; a plurality of slidable plates, one for each register, and engaged by the ears on said pinion-shaft; a locking-slide for each group of registers and moved by the rotation of said pinion-shafts; a resetting-slide common to all said locking-slides; and means which lock the registers in all said groups when any register in the straight-ticket group is actuated.

18. In a registering-machine, the combination of a plurality of supporting back plates; a plurality of groups of rotary registers, one of said groups being secured upon each of said supporting back plates and each of said rotary registers being made up of a plurality of intermeshing counting-disks, indicating mechanism and an actuating-pinion in mesh with said counting-disks; the shafts of said actuating-pinions, provided with ears; a plurality of wheels provided with projecting studs, one of which is fast upon each of said pinion-shafts; a plurality of tapes, one of said tapes being secured to each of said supporting back plates and adjusted in close proximity to the pinion-shafts of the group of registers secured on said supporting back plate, thereby preventing the actuation of more than one register in said group at the same time; a plurality of notched locking-slides, one notched locking-slide being provided for each of said groups of registers, said notched locking-slides engaging the ears upon the pinion-shafts of its group and provided with projecting studs which engage a resetting-slide, the notched locking-slide of one of said groups being provided with a toothed rack, the locking-slides of the remaining groups being provided with projecting studs which engage an interlocking slide; a plurality of supplementary slidable notched plates, one of said plates being provided for each of said register-actuators and engaging the ears upon the pinion-shaft of the said register; a pinion in mesh with the toothed rack on one of said notched locking-slides; an interlocking slide formed with a toothed rack in mesh with said pinion and formed with notches which receive projecting studs upon said locking-slides; and a resetting-slide which engages projecting studs on the said notched locking-slides and thereby resets the said notched locking-slides, said interlocking slide and those of said notched slidable plates which have been moved by the actuation of said registers.

19. In a registering-machine, the combination of a plurality of supporting back plates; a plurality of groups of rotary registers; an actuating-pinion for each register; the shafts of said actuating-pinions provided with ears; a tape for each group of registers, said tape being adjusted in close proximity to the pinion-shafts of its group and made taut by the rotation of said pinion-shafts; a plurality of slidable plates, one for each register and engaged by the ears on said pinion-shaft; a locking-slide for each group of registers and moved by the rotation of said pinion-shafts; a resetting-slide common to all said locking-slides; and an elevating-slide which raises any desired locking-slide to its locking position.

20. In a registering-machine, the combination of a plurality of supporting back plates; a plurality of groups of rotary registers, one of said groups being secured upon each of said supporting back plates and each of said rotary registers being made up of a plurality of intermeshing counting-disks, indicating mechanism and an actuating-pinion in mesh with said counting-disks; the shafts of said actuating-pinions, provided with ears; a plurality of wheels provided with projecting studs, one of which is fast upon each of said pinion-shafts; a plurality of tapes, one of said tapes being secured to each of said supporting back plates and adjusted in close proximity to the pinion-shafts of the group of registers secured on said supporting back plate, thereby preventing the actuation of more than one register in said group at the same time; a plurality of notched locking-slides, one locking-slide being provided for each of said groups of registers, said notched locking-slide engaging the ears upon the pinion-shafts of its group and provided with projecting studs; a plurality of supplementary slidable notched plates, one of said plates being provided for each register-actuator and engaging the ears upon the pinion-shaft of the said register; an elevating-slide having inclined projections which engage projecting studs on said notched locking-slides and thereby move said notched locking-slides into a locking position; and a resetting-slide which engages projecting studs on said notched locking-slides and thereby restores to their original positions the notched locking-slides and the supplementary slidable notched plates moved therefrom by the actuation of the said registers.

21. In a registering-machine, the combination of a card-delivering mechanism; means to actuate said mechanism; means whereby the actuation of said mechanism locks said mechanism; a card-receptacle; and means to unlock the said mechanism and rotate the said receptacle.

22. In a registering-machine, a mechanism for a multicandidate group comprising a frame; a casing; having main shafts provided with ears; a plurality of notched plates, one for each register and formed each with a toothed rack, each plate being engaged by the ears on the shaft of its register; a plurality of pinions adapted to engage said toothed racks; an arm for and secured to each of said pinions; a cord adjusted in close proximity to said arms and made taut by the rotation of said arms; a plurality of disks which support said cord; and means which reset said notched plates after the actuation of the registers.

23. A registering-machine comprising a frame; a front casing made up in sections; means to secure said sectional casing within said frame; a plurality of rotary registers; a card-delivering mechanism; means to actuate said registers; means to actuate said card-delivering mechanism; means to lock said registers when said card-delivering mechanism is actuated; a table-support; a rotating card-receptacle within said table-support; and means to unlock said registers and to rotate said receptacle.

24. A registering-machine comprising a frame; a casing; means to secure said casing within said frame; a plurality of rotary registers; a card-delivering mechanism; means to actuate said registers; means to actuate said card-delivering mechanism; means to lock said registers when said card-delivering mechanism is actuated; a table-support; a rotary card-receptacle within said table-support; and means to unlock said registers and to rotate said receptacle.

25. A registering-machine comprising a frame; a casing; means to secure said casing within said frame; a plurality of rotary registers; a card-delivering mechanism; means to actuate said registers; means to actuate said card-delivering mechanism; means to lock said card-delivering mechanism when a register is actuated; a table-support; a rotary card-receptacle within said table-support; and means to unlock said card-delivering mechanism and to rotate said receptacle.

26. A registering-machine comprising a frame; a casing removably secured within said frame; means to secure said casing in said frame; a plurality of rotary registers arranged in groups, each group being mounted upon a supporting back plate; a plurality of said supporting back plates detachably secured within said frame; means which actuate said registers; means which lock said registers; and a resetting-slide common to all said groups for unlocking said registers.

27. A registering-machine comprising a frame; a casing secured within said frame; means which secure said casing within said frame; a plurality of rotary registers arranged in groups, each group being mounted upon a supporting back plate; a plurality of said supporting back plates detachably secured within said frame; means which actuate said registers; means which lock said registers; means which indicate which register has been actuated; and a resetting-slide common to all said groups for unlocking said registers.

28. A registering-machine comprising a frame; a casing secured within said frame; means which secure said casing within said frame; a plurality of rotary registers arranged in groups, each group being mounted upon a supporting back plate; said back plate detachably secured within said frame; means which actuate said registers; means which lock said registers; a resetting-slide common to all said groups for unlocking said register-actuators; a plurality of placards; and means which secure said placards in said casing.

29. In a registering-machine, the combination of a supporting back plate; a plurality of rotary registers; an actuating-pinion for each register; the shaft of said actuating-pinion provided with ears; a toothed wheel mounted on said pinion-shaft; a pawl which engages said wheel and prevents backward rotation of said shaft; a tape adjusted in close proximity to said pinion-shafts and made taut by the rotation of said pinion-shafts; and a locking-slide common to each group of registers; and a resetting-slide common to all said locking-slides.

30. In a registering-machine, the combination of a supporting back plate; a plurality of rotary registers arranged in groups and mounted upon said back plate; an actuating-pinion for each register; the shaft of said actuating-pinion provided with ears; a toothed wheel mounted on said pinion-shaft; a pawl which engages said wheel and prevents backward rotation of said shaft; a plurality of locking-slides, one locking-slide for each group of registers; mechanism which locks the registers in all the groups when a register in the straight-ticket group is actuated; a tape for each group of registers, said tape being adjusted in close proximity to the pinion-shafts of its group and made taut by the rotation of said pinion-shafts; and a resetting-slide common to all said locking-slides.

In testimony whereof I have signed my name to this specification, in the presence of two subscribing witnesses, on this 9th day of November, A. D. 1898.

ARTHUR FRANCIS BARDWELL.

Witnesses:
EDWARD S. BEACH,
JAMES HAMILTON.